United States Patent
Ye et al.

(10) Patent No.: US 11,531,189 B2
(45) Date of Patent: Dec. 20, 2022

(54) OPTICAL IMAGING SYSTEM

(71) Applicant: Zhejiang Sunny Optical Co., Ltd., Ningbo (CN)

(72) Inventors: Lihui Ye, Ningbo (CN); Fujian Dai, Ningbo (CN); Liefeng Zhao, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 330 days.

(21) Appl. No.: 16/860,725

(22) Filed: Apr. 28, 2020

(65) Prior Publication Data

US 2020/0355891 A1    Nov. 12, 2020

(30) Foreign Application Priority Data

May 10, 2019    (CN) .......................... 201910389382.4

(51) Int. Cl.
  *G02B 13/00* (2006.01)
  *G02B 9/64* (2006.01)
(52) U.S. Cl.
  CPC ........... *G02B 13/0045* (2013.01); *G02B 9/64* (2013.01)
(58) Field of Classification Search
  CPC ............................. G02B 13/0045; G02B 9/64
  USPC ........................................................ 359/750
  See application file for complete search history.

(56) References Cited

U.S. PATENT DOCUMENTS

| 2019/0204560 A1* | 7/2019 | Jhang ................ G02B 9/64 |
| 2019/0391365 A1* | 12/2019 | Son .................. G02B 7/021 |
| 2020/0209594 A1* | 7/2020 | Hirano ............... G02B 9/64 |
| 2021/0018729 A1* | 1/2021 | Li ................... G02B 9/64 |
| 2021/0223515 A1* | 7/2021 | Tseng ............. G02B 13/0045 |

FOREIGN PATENT DOCUMENTS

| CN | 108227145 A | * | 6/2018 | ........... G02B 1/041 |
| CN | 108873272 A | * | 11/2018 | ........ G02B 13/0045 |
| GN | 109343205 A | | 2/2019 | |
| JP | H1144844 A | | 2/1999 | |

OTHER PUBLICATIONS

Office Action from Intellectual Property of India for Application No. 202044019462, dated Aug. 11, 2021, 5 pages.

* cited by examiner

*Primary Examiner* — George G. King
(74) *Attorney, Agent, or Firm* — Barnes & Thornburg LLP

(57) ABSTRACT

The present disclosure discloses an optical imaging system including a first lens, a second lens, a third lens, a fourth lens, a fifth lens, a sixth lens, a seventh lens and an eighth lens, each of which has refractive power. An object-side surface of the second lens is a convex surface, and an image-side surface thereof is a concave surface; an object-side surface of the fourth lens is a convex surface, and an image-side surface thereof is a concave surface; an object-side surface of the fifth lens is a concave surface, and an image-side surface thereof is a convex surface; and each of the third lens and the sixth lens has positive refractive power. A radius of curvature R11 of an object-side surface of the sixth lens and a radius of curvature R12 of an image-side surface of the sixth lens satisfy 0.5<R11/R12<1.5.

18 Claims, 12 Drawing Sheets

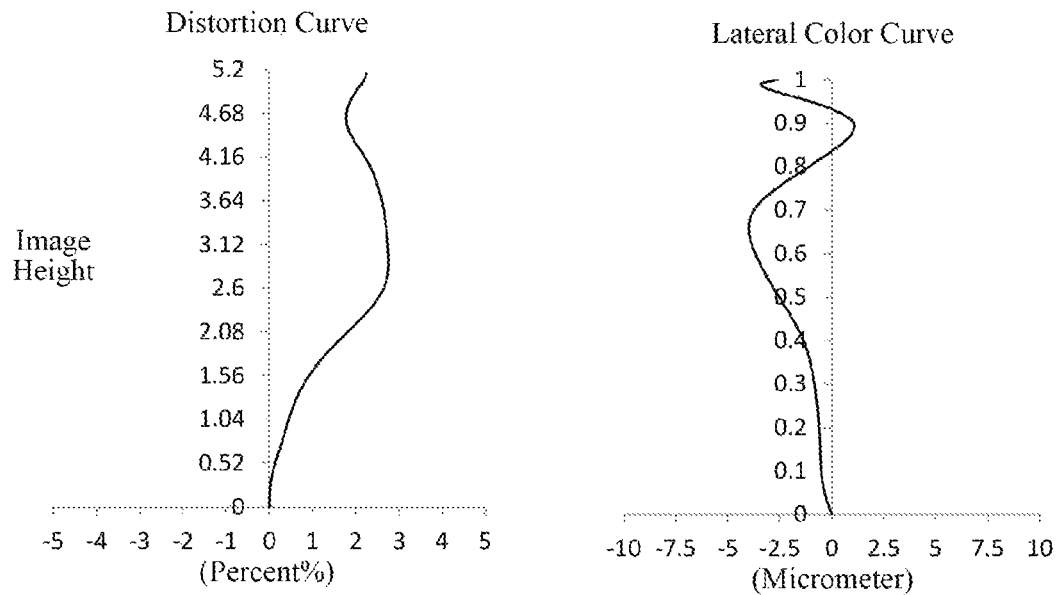
Fig. 6C
Fig. 6D
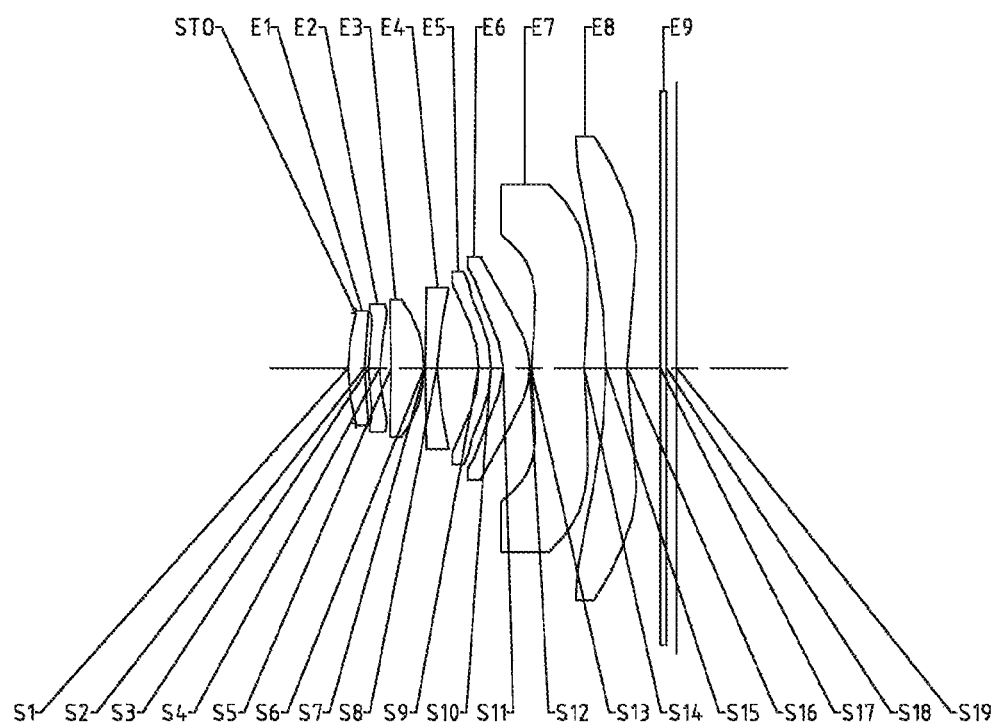
Fig. 7

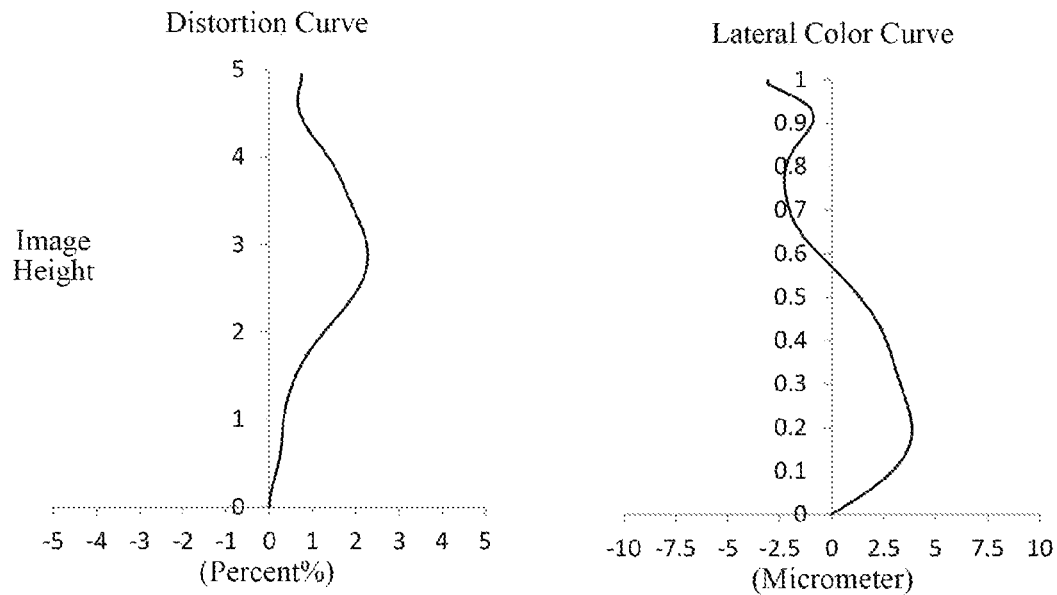
Fig. 14C
Fig. 14D
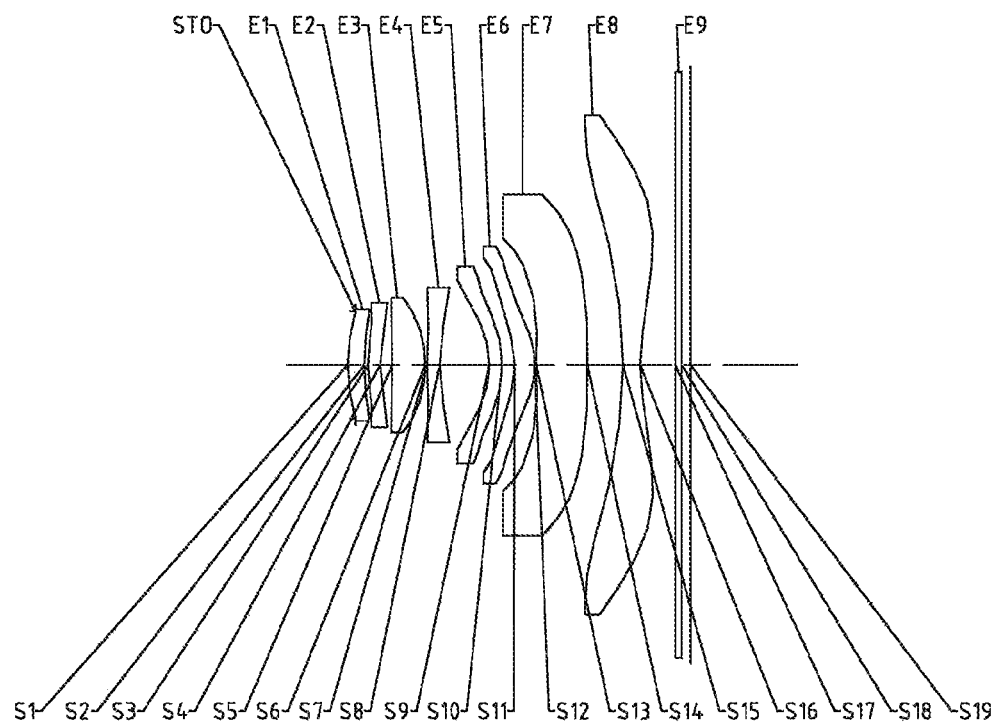
Fig. 15

OPTICAL IMAGING SYSTEM

CROSS-REFERENCE TO RELATED APPLICATIONS

This application claims benefit of priority to Chinese Patent Application No. 201910389382.4 filed on May 10, 2019 before the China National Intellectual Property Administration, the entire disclosure of which is incorporated herein by reference in its entity.

TECHNICAL FIELD

The present disclosure relates to an optical imaging system, and more specifically, relates to an optical imaging system including eight lenses.

BACKGROUND

In recent years, with the development of science and technology, the market demand for camera lens assemblies suitable for portable electronic products has gradually increased. The rapid development of mobile phone lens modules, especially the popularity of large-sized, high-pixel CMOS chips, has caused mobile phone manufacturers to place more stringent requirements on the imaging quality of the lens assemblies. In addition, as the performance of CCD and CMOS elements increases and the size thereof reduces, higher requirements for high imaging quality and miniaturization are placed on the matched imaging systems.

In order to meet the needs of miniaturization and imaging requirements, an optical imaging system capable of both miniaturization and large image plane, large viewing angle, and high resolution is required.

SUMMARY

The present disclosure provides an optical imaging system that is applicable to portable electronic products and at least solves or partially addresses at least one of the above disadvantages of the prior art.

The present disclosure provides an optical imaging system including, sequentially from an object side to an image side along an optical axis, a first lens, a second lens, a third lens, a fourth lens, a fifth lens, a sixth lens, a seventh lens and an eighth lens, each of which has refractive power. An object-side surface of the second lens may be a convex surface, and an image-side surface of the second lens may be a concave surface; an object-side surface of the fourth lens may be a convex surface, and an image-side surface of the fourth lens may be a concave surface; an object-side surface of the fifth lens may be a concave surface, and an image-side surface of the fifth lens may be a convex surface; both of the third lens and the sixth lens may have positive refractive power.

In one embodiment, half of a maximal field-of-view Semi-FOV of the optical imaging system may satisfy Semi-FOV≥48°.

In one embodiment, a distance TTL along the optical axis from an object-side surface of the first lens to an imaging plane of the optical imaging system and half of a diagonal length ImgH of an effective pixel area on the imaging plane of the optical imaging system may satisfy 1.0<TTL/ImgH<1.5.

In one embodiment, an effective focal length f2 of the second lens and an effective focal length f1 of the first lens may satisfy 1.0<|f2|/f1<2.5.

In one embodiment, the eighth lens may have a negative refractive power.

In one embodiment, an effective focal length f4 of the fourth lens and an effective focal length f8 of the eighth lens may satisfy 0.5<f4/f8<2.0.

In one embodiment, a radius of curvature R3 of the object-side surface of the second lens and a radius of curvature R4 of the image-side surface of the second lens may satisfy 0.5<R3/R4<1.5.

In one embodiment, a radius of curvature R7 of the object-side surface of the fourth lens and a radius of curvature R8 of the image-side surface of the fourth lens may satisfy 2.0<R7/R8<2.5.

In one embodiment, a radius of curvature R9 of the object-side surface of the fifth lens and a radius of curvature R10 of the image-side surface of the fifth lens may satisfy 0.5<R10/R9<1.5.

In one embodiment, a radius of curvature R2 of an image-side surface of the first lens and a radius of curvature R1 of an object-side surface of the first lens may satisfy 1.0<R2/R1<2.0.

In one embodiment, a radius of curvature R11 of an object-side surface of the sixth lens and a radius of curvature R12 of an image-side surface of the sixth lens may satisfy 0.5<R11/R12<1.5.

In one embodiment, a radius of curvature R15 of an object-side surface of the eighth lens and a radius of curvature R16 of an image-side surface of the eighth lens may satisfy −2.5<R15/R16<−1.

In one embodiment, a center thickness CT1 of the first lens along the optical axis and a spaced interval T12 between the first lens and the second lens along the optical axis may satisfy 3<CT1/T12<4.5.

In one embodiment, a center thickness CT3 of the third lens along the optical axis and a center thickness CT5 of the fifth lens along the optical axis may satisfy 2.5<CT3/CT5<3.0.

In one embodiment, a spaced interval T45 between the fourth lens and the fifth lens along the optical axis and a center thickness CT4 of the fourth lens along the optical axis may satisfy 3.5<T45/CT4<4.5.

In one embodiment, a total effective focal length f of the optical imaging system and an effective focal length f3 of the third lens may satisfy 1.0<f/f3<2.0.

In one embodiment, a refractive index N3 of the third lens may satisfy N3>1.7.

In one embodiment, an Abbe number V3 of the third lens may satisfy V3≥45.6.

In one embodiment, a total effective focal length f of the optical imaging system and an entrance pupil diameter EPD of the optical imaging system may satisfy f/EPD<2.5.

In one embodiment, half of a diagonal length ImgH of an effective pixel area on an imaging plane of the optical imaging system may satisfy ImgH>4.8 mm.

The present disclosure employs eight lenses, and the optical imaging system has at least one advantageous effect such as large image surface, large field of view, and high resolution and the like by rationally matching lenses of different materials and rationally assigning the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the accompanying drawings:

FIG. 6C illustrates a distortion curve of the optical imaging system of the Example 3;

FIG. 6D illustrates a lateral color curve of the optical imaging system of the Example 3;

FIG. 7 illustrates a schematic structural view of an optical imaging system according to Example 4 of the present disclosure;

FIG. 14C illustrates a distortion curve of the optical imaging system of the Example 7;

FIG. 14D illustrates a lateral color curve of the optical imaging system of the Example 7;

FIG. 15 illustrates a schematic structural view of an optical imaging system according to Example 8 of the present disclosure;

DETAILED DESCRIPTION OF EMBODIMENTS

Figure 1:
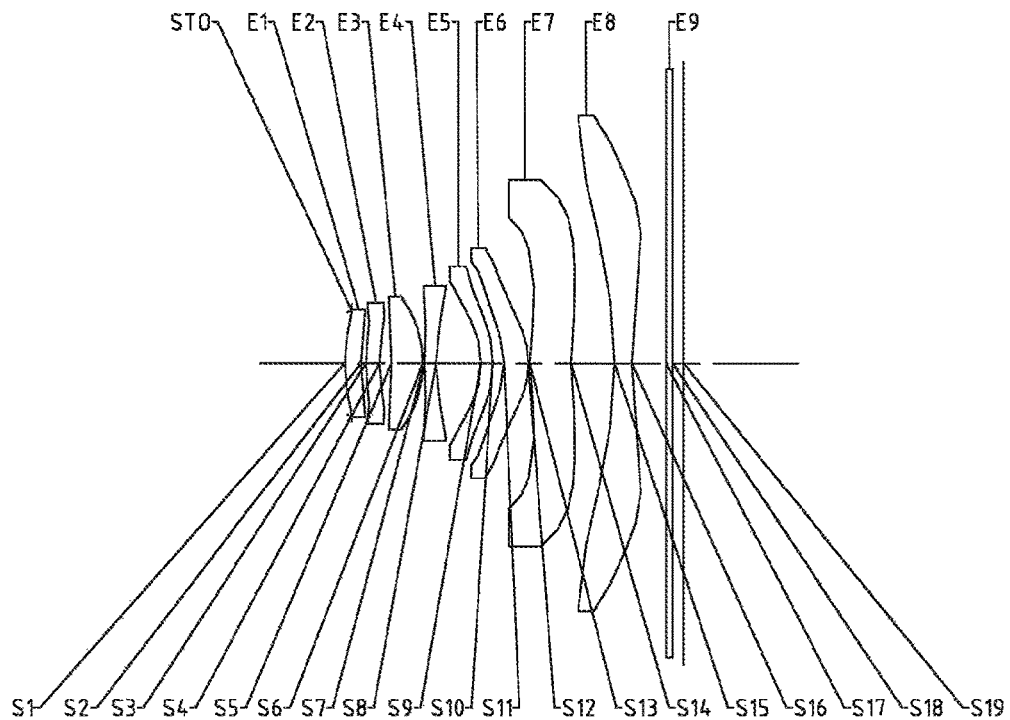
FIG. 1 illustrates a schematic structural view of an optical imaging system according to Example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been slightly exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is a convex surface and the position of the convex is not defined, it indicates that the surface of the lens is convex at least in the paraxial region; and if a surface of a lens is a concave surface and the position of the concave is not defined, it indicates that the surface of the lens is concave at least in the paraxial region. In each lens, the surface closest to the subject is referred to as an object-side surface of the lens, and the surface closest to the imaging plane is referred to as an image-side surface of the lens.

It should be further understood that the terms "comprising," "including," "having," "containing" and/or "contain,"

when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples.

The features, principles, and other aspects of the present disclosure are described in detail below.

An optical imaging system according to an exemplary embodiment of the present disclosure may include, for example, eight lenses having refractive power, i.e. a first lens, a second lens, a third lens, a fourth lens, a fifth lens, a sixth lens, a seventh lens, and an eighth lens. The eight lenses are arranged sequentially from an object side to an image side along an optical axis. Among the first lens to the eighth lens, an air gap may be provided between any two adjacent lenses.

In an exemplary embodiment, the first lens has a positive refractive power or a negative refractive power; the second lens has a positive refractive power or a negative refractive power, an object-side surface thereof may be a convex surface, and an image-side surface thereof may be a concave surface; the third lens may have a positive refractive power; the fourth lens has a positive refractive power or a negative refractive power, an object-side surface thereof may be a convex surface, and an image-side surface thereof may be a concave surface; the fifth lens has a positive refractive power or a negative refractive power, an object-side surface thereof is a concave surface, and an image-side surface thereof is a convex surface; the sixth lens may have a positive refractive power; the seventh lens has a positive refractive power or a negative refractive power; the eighth lens may have a negative refractive power. The low-order aberrations of the system are effectively compensated by rationally controlling the positive and negative distribution of the refractive power and the surface curvature of each component in the system. When the refractive power of the third lens is positive, the off-axis aberration of the optical lens group is effectively corrected, thereby improving the imaging quality. When the refractive power of the eighth lens is negative, effective sharing of a large field of view is advantageously achieved, a larger field of view angle range is obtained, and the optical system's ability to collect object-side information is improved.

In an exemplary embodiment, the first lens may have a positive refractive power.

In an exemplary embodiment, an image-side surface of the third lens may be a convex surface.

In an exemplary embodiment, the optical imaging system according to the present disclosure may satisfy: Semi-FOV≥48°, where Semi-FOV is half of a maximal field-of-view of the optical imaging system. More specifically, Semi-FOV may further satisfy: 48.9°≤Semi-FOV≤51.7°. When Semi-FOV≥48° is satisfied, the imaging system has a relatively large field-of-view range.

In an exemplary embodiment, the optical imaging system according to the present disclosure may satisfy: 1.0<TTL/ImgH<1.5, where TTL is a distance along the optical axis from an object-side surface of the first lens to an imaging plane of the optical imaging system, and ImgH is half of a diagonal length of an effective pixel area on the imaging plane of the optical imaging system. More specifically, TTL and ImgH may further satisfy: 1.0<TTL/ImgH<1.3, for example, 1.11≤TTL/ImgH≤1.18. By controlling the ratio of TTL to ImgH, the needs for miniaturization of the imaging system are met.

In an exemplary embodiment, the optical imaging system according to the present disclosure may satisfy: 1.0<|f2|/f1<2.5, where f2 is an effective focal length of the second lens and f1 is an effective focal length of the first lens. More specifically, f2 and f1 may further satisfy: 1.38≤|f2|/f1≤2.29. When the optical imaging system satisfies 1.0<|f2|/f1<2.5, the object side end may have sufficient convergence ability to adjust the focus position of the light beam, thereby shortening the total system length.

In an exemplary embodiment, the optical imaging system according to the present disclosure may satisfy: 0.5<f4/f8<2.0, where f4 is an effective focal length of the fourth lens, and f8 is an effective focal length of the eighth lens. More specifically, f4 and f8 may further satisfy: 0.97≤f4/f8≤1.71. By rationally assigning the focal lengths of the fourth lens and the eighth lens, the refractive power of the rear section of the system is controlled in a small range, and the deflection angle of the light may be reduced, thereby reducing the sensitivity of the system. Optionally, the fourth lens may have a negative refractive power and the eighth lens may have a negative refractive power.

In an exemplary embodiment, the optical imaging system according to the present disclosure may satisfy: 0.5<R3/R4<1.5, where R3 is a radius of curvature of the object-side surface of the second lens, and R4 is a radius of curvature of the image-side surface of the second lens. More specifically, R3 and R4 may further satisfy: 0.96≤R3/R4≤1.28. When the radius of curvature R3 of the object-side surface of the second lens and the radius of curvature R4 of the image-side surface of the second lens satisfy 0.5<R3/R<1.5, the spherical aberration and the astigmatic of the system is advantageously reduced.

In an exemplary embodiment, the optical imaging system according to the present disclosure may satisfy: f/EPD<2.5, where f is an effective focal length of the optical imaging system, and EPD is an entrance pupil diameter of the optical imaging system. More specifically, f and EPD may further satisfy: 1.98≤f/EPD≤2.37. By increasing the amount of light that can enter, the optical imaging system may have the advantage of a large aperture, thereby reducing the aberrations at the edge field of view while enhancing the imaging effect in a dark environment.

In an exemplary embodiment, the optical imaging system according to the present disclosure may satisfy: 2.0<R7/R8<2.5, where R7 is a radius of curvature of the object-side surface of the fourth lens, and R8 is a radius of curvature of the image-side surface of the fourth lens. More specifically, R7 and R8 may further satisfy: 2.05≤R7/R8≤2.27. By controlling the bending direction of the fourth lens, the field curvature of the system is effectively controlled, and the image quality of the system is improved.

In an exemplary embodiment, the optical imaging system according to the present disclosure may satisfy: 0.5<R10/R9<1.5, where R9 is a radius of curvature of the object-side surface of the fifth lens and R10 is a radius of curvature of the image-side surface of the fifth lens. More specifically, R10 and R9 may further satisfy: 0.98≤R10/R9≤1.36. By controlling the bending direction of the fifth lens, the field curvature of the system is effectively controlled, and the image quality of the system is improved.

In an exemplary embodiment, the optical imaging system according to the present disclosure may satisfy: 1.0<R2/R1<2.0, where R2 is a radius of curvature of an image-side surface of the first lens, and R1 is a radius of curvature of an object-side surface of the first lens. More specifically, R2 and R1 may further satisfy: 1.19≤R2/R1≤1.65. By controlling the radius of curvature of the object-side surface and the image-side surface of the first lens, 1.0<R2/R1<2.0 may be satisfied, so that the optical system may have a larger aperture, thereby improving the overall brightness of the image. Optionally, the object-side surface of the first lens may be a convex surface, and the image-side surface of the first lens may be a concave surface.

In an exemplary embodiment, the optical imaging system according to the present disclosure may satisfy: 0.5<R11/R12<1.5, where R11 is a radius of curvature of an object-side surface of the sixth lens, and R12 is a radius of curvature of an image-side surface of the sixth lens. More specifically, R11 and R12 may further satisfy: 0.89≤R11/R12≤1.37. When the radius of curvature R11 of the object-side surface of the sixth lens and the radius of curvature R12 of the image-side surface of the sixth lens satisfy 0.5<R11/R12<1.5, the chromatic aberration of the system may be corrected, and the compensate of various aberrations may be achieved at the same time. Optionally, the object-side surface of the sixth lens may be a concave surface, and the image-side surface of the sixth lens may be a convex surface.

In an exemplary embodiment, the optical imaging system according to the present disclosure may satisfy: −2.5<R15/R16<−1, where R15 is a radius of curvature of an object-side surface of the eighth lens, and R16 is a radius of curvature of an image-side surface of the eighth lens. More specifically, R15 and R16 may further satisfy: −2.28≤R15/R16≤−1.13. Controlling the ratio of the radii of curvature of the object-side surface and the image-side surface of the eighth lens helps to correct the overall aberration of the imaging system. Optionally, the object-side surface of the eighth lens may be a concave surface, and the image-side surface of the eighth lens may be a concave surface.

In an exemplary embodiment, the optical imaging system according to the present disclosure may satisfy: 3<CT1/T12<4.5, where CT1 is a center thickness of the first lens along the optical axis, and T12 is an air interval between the first lens and the second lens along the optical axis. More specifically, CT1 and T12 may further satisfy: 3.17≤CT1/T12≤4.42. Reasonably controlling the center thickness of the first lens along the optical axis and the air interval between the first lens and the second lens along the optical axis helps to distribute the lens size uniformly, ensure assembly stability, and helps to reduce the aberration of the entire optical imaging lens assembly and shorten the total length of the optical imaging lens.

In an exemplary embodiment, the optical imaging system according to the present disclosure may satisfy: 2.5<CT3/CT5<3.0, where CT3 is a center thickness of the third lens along the optical axis, and CT5 is a center thickness of the fifth lens along the optical axis. More specifically, CT3 and CT5 may further satisfy: 2.59≤CT3/CT5≤2.93. The center thickness CT3 of the third lens and the center thickness CT5 of the fifth lens along the optical axis satisfy 2.5<CT3/CT5<3.0, which helps to distribute the lens size uniformly, and may effectively reduce the size of the optical system, avoid the excessive size of the optical imaging lens. At the same time, the assembly difficulty of the lens is reduced and a high space utilization rate is achieved.

In an exemplary embodiment, the optical imaging system according to the present disclosure may satisfy: 3.5<T45/CT4<4.5, where T45 is an air interval between the fourth lens and the fifth lens along the optical axis, and CT4 is a center thickness of the fourth lens along the optical axis. More specifically, T45 and CT4 may further satisfy: 3.61≤T45/CT4≤4.18. By satisfying this, the distribution of lens size is uniform, the assembly stability is guaranteed, the aberrations of the entire imaging system is reduced, and the overall length of the imaging system is shortened.

In an exemplary embodiment, the optical imaging system according to the present disclosure may satisfy: 1.0<f/f3<2.0, where f is a total effective focal length of the optical imaging system, and f3 is an effective focal length of the third lens. More specifically, f and f3 may further satisfy: 1.3<f/f3<1.7, for example, 1.41≤f/f3≤1.63. By controlling the refractive power of the third lens, the tolerance sensitivity is reduced, and the miniaturization of the imaging system is maintained.

In an exemplary embodiment, the optical imaging system according to the present disclosure may satisfy: N3>1.7, where N3 is a refractive index of the third lens. More specifically, N3 may further satisfy: 1.75≤N3≤1.76. Controlling the refractive index N3 of the third lens to be greater than 1.7 is conducive to controlling the edge angle of the lens, and may effectively control the edge light of the system, such that the system image quality is advantageously improved.

In an exemplary embodiment, the optical imaging system according to the present disclosure may satisfy: ImgH>4.8 mm, where ImgH is half of a diagonal length of an effective pixel area on an imaging plane of the optical imaging system. More specifically, ImgH may further satisfy: 4.85 mm≤ImgH≤5.20 mm. The half of the diagonal length of the effective pixel area on the imaging surface, ImgH, is greater than 4.8 mm, which is conducive to improving the image quality of the system when the object size is constant.

In an exemplary embodiment, the optical imaging system according to the present disclosure may satisfy: V3≥45.6, where V3 is an Abbe number of the third lens. For example, V3 may satisfy: 45.50≤V3≤45.60. By controlling the Abbe number of the third lens, the chromatic aberration of the system may be effectively controlled, and at the same time, the correction of each aberration may be achieved.

In an exemplary embodiment, the optical imaging system described above may further include at least one stop. The stop may be disposed at an appropriate position as required, for example, between the object side and the first lens. Optionally, the above optical imaging system may further include an optical filter for correcting the color deviation and/or a protective glass for protecting the photosensitive element on the imaging plane.

The optical imaging system according to the above embodiments of the present disclosure may employ a plurality of lenses, such as eight lenses as described above. By properly assigning the refractive power of each lens, the surface shape, the center thickness of each lens, and spaced intervals on the optical axis between the lenses, the size and the sensitivity of the optical imaging system may be effectively reduced, and the workability of the optical imaging system may be improved, such that the optical imaging system is more advantageous for production processing and may be applied to portable electronic products. At the same time, the optical imaging system of the present disclosure also has excellent optical performance such as a large image plane, a large viewing angle, and a high resolution.

In the embodiments of the present disclosure, at least one of the surfaces of each lens is aspheric, that is, at least one of the object-side surface and the image-side surface of each of the first lens, the second lens, the third lens, the fourth lens, the fifth lens, the sixth lens, the seventh lens, and the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens, the seventh lens, and the eighth lens are aspheric.

However, it will be understood by those skilled in the art that the number of lenses constituting the optical imaging system may be varied to achieve the various results and advantages described in this specification without departing from the technical solution claimed by the present disclosure. For example, although the embodiment is described by taking eight lenses as an example, the optical imaging system is not limited to include eight lenses. The optical imaging system may also include other numbers of lenses if desired.

Some specific examples of an optical imaging system applicable to the above embodiment will be further described below with reference to the accompanying drawings.

Example 1

An optical imaging system according to example 1 of the present disclosure is described below with reference to FIG. 1 to FIG. 2D. FIG. 1 shows a schematic structural view of the optical imaging system according to example 1 of the present disclosure.

As shown in FIG. 1, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a positive refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

Table 1 shows a table of basic parameters of the optical imaging system in example 1, wherein the units for the radius of curvature, the thickness and the focal length are millimeter (mm).

TABLE 1

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.1136 | | | | |
| S1 | aspheric | 2.8511 | 0.2744 | 1.55 | 56.11 | 28.20 | 3.5568 |
| S2 | aspheric | 3.3802 | 0.0866 | | | | −27.5788 |
| S3 | aspheric | 2.7000 | 0.2305 | 1.67 | 20.40 | 59.11 | −3.6048 |
| S4 | aspheric | 2.8000 | 0.2038 | | | | 1.4599 |
| S5 | aspheric | −60.8528 | 0.5386 | 1.76 | 45.60 | 2.77 | 99.0000 |
| S6 | aspheric | −2.0402 | 0.0250 | | | | −0.1904 |
| S7 | aspheric | 5.8253 | 0.2000 | 1.67 | 20.40 | −7.09 | 13.7259 |
| S8 | aspheric | 2.5706 | 0.7661 | | | | −0.5113 |
| S9 | aspheric | −2.0052 | 0.2025 | 1.55 | 56.11 | −15.29 | −0.0160 |
| S10 | aspheric | −2.7335 | 0.1961 | | | | −0.2236 |
| S11 | aspheric | −1.3129 | 0.4242 | 1.55 | 56.11 | 17.61 | −1.0810 |
| S12 | aspheric | −1.2870 | 0.0250 | | | | −1.0021 |
| S13 | aspheric | 3.1342 | 0.7035 | 1.64 | 25.92 | 16.64 | −0.6308 |
| S14 | aspheric | 4.0563 | 0.7409 | | | | −58.5492 |

TABLE 1-continued

| Surface number | Surface type | Radius of curvature | Thickness | Material Refractive index | Abbe number | Focal length | Conic coefficient |
|---|---|---|---|---|---|---|---|
| S15 | aspheric | −8.2533 | 0.3000 | 1.55 | 23.84 | −6.46 | 0.6124 |
| S16 | aspheric | 6.2335 | 0.5859 | | | | −0.6602 |
| S17 | spherical | infinite | 0.1100 | 1.52 | 64.17 | | |
| S18 | spherical | infinite | 0.1870 | | | | |
| S19 | spherical | infinite | | | | | |

In example 1, a total effective focal length f of the optical imaging system satisfies f=4.16 mm, an axial distance TTL from the object-side surface of the first lens to the imaging plane satisfies TTL=5.80 mm, half of a diagonal length ImgH of an effective pixel area on the imaging plane satisfies ImgH=5.15 mm, and half of a maximal field-of-view Semi-FOV satisfies Semi-FOV=50.5°.

In example 1, the object-side surface and the image-side surface of any one of the first lens E1 to the eighth lens E8 are aspheric. The surface shape x of each aspheric lens may be defined by using, but not limited to, the following aspheric formula:

$$x = \frac{ch^2}{1 + \sqrt{1-(k+1)c^2h^2}} + \sum A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; Ai is a correction coefficient for the i-th order of the aspheric surface. Table 2 below shows high-order coefficients A4, A6, A8, A10, A12, A14, A16, A18 and A20 applicable to each aspheric surface S1-S16 in example 1.

TABLE 2

| Surface number | A4 | A6 | A8 | A10 | A12 |
|---|---|---|---|---|---|
| S1 | −6.4943E−02 | 1.4761E−01 | −1.1619E+00 | 4.9048E+00 | −1.2659E+01 |
| S2 | −6.7824E−03 | −2.6937E−01 | 1.7303E+00 | −7.6773E+00 | 2.1909E+01 |
| S3 | −1.1225E−01 | −6.7322E−03 | −2.6142E−01 | 1.3685E+00 | −4.4649E+00 |
| S4 | −5.8676E−02 | −1.6966E−01 | 7.9734E−01 | −3.0026E+00 | 7.1247E+00 |
| S5 | −2.2299E−02 | 1.7365E−02 | −8.5743E−02 | 1.3290E−01 | 7.4888E−02 |
| S6 | −1.8118E−02 | 6.7292E−02 | −2.2416E−01 | 2.4188E−01 | −5.8259E−02 |
| S7 | −1.7879E−01 | 4.0774E−01 | −9.6596E−01 | 1.4889E+00 | −1.5501E+00 |
| S8 | −1.8354E−01 | 2.9214E−01 | −4.6340E−01 | 5.0785E−01 | −3.7189E−01 |
| S9 | −2.3462E−01 | 5.2151E−01 | −1.1905E+00 | 2.0374E+00 | −2.1238E+00 |
| S10 | −2.2307E−01 | 4.5036E−01 | −7.0724E−01 | 7.6022E−01 | −4.8634E−01 |
| S11 | 2.2394E−01 | −1.7879E−01 | 1.7450E−01 | −1.9064E−01 | 1.6209E−01 |
| S12 | 1.5104E−01 | −2.1992E−01 | 2.8353E−01 | −2.1206E−01 | 9.9205E−02 |
| S13 | −1.0018E−01 | −1.2424E−02 | 4.3826E−02 | −2.5701E−02 | 8.1114E−03 |
| S14 | 2.0637E−03 | −3.9340E−02 | 2.9513E−02 | −1.0719E−02 | 2.2858E−03 |
| S15 | −5.3845E−03 | 5.2523E−03 | −1.7555E−03 | 2.9635E−04 | −2.6996E−05 |
| S16 | −2.4149E−02 | 9.1168E−03 | −2.6883E−03 | 4.7519E−04 | −5.4557E−05 |

| Surface number | A14 | A16 | A18 | A20 |
|---|---|---|---|---|
| S1 | 2.0242E+01 | −1.9546E+01 | 1.0447E+01 | −2.3749E+00 |
| S2 | −3.8920E+01 | 4.1558E+01 | −2.4226E+01 | 5.8500E+00 |
| S3 | 9.5608E+00 | −1.2856E+01 | 9.7107E+00 | −3.1604E+00 |
| S4 | −1.0558E+01 | 9.4519E+00 | −4.6900E+00 | 9.8681E−01 |
| S5 | −5.8302E−01 | 8.4386E−01 | −5.2678E−01 | 1.2519E−01 |
| S6 | −9.4352E−02 | 6.9236E−02 | −4.4645E−03 | −3.9490E−03 |
| S7 | 1.0857E+00 | −4.8315E−01 | 1.2226E−01 | −1.3413E−02 |
| S8 | 1.7750E−01 | −4.9619E−02 | 6.3145E−03 | −8.4977E−05 |
| S9 | 1.3775E+00 | −5.5426E−01 | 1.2771E−01 | −1.2929E−02 |
| S10 | 1.8672E−01 | −4.3048E−02 | 5.6168E−03 | −3.2982E−04 |
| S11 | −8.8560E−02 | 2.9081E−02 | −5.2627E−03 | 4.0397E−04 |
| S12 | −3.0006E−02 | 5.7605E−03 | −6.4699E−04 | 3.2782E−05 |
| S13 | −1.5976E−03 | 2.0004E−04 | −1.4792E−05 | 4.9375E−07 |
| S14 | −3.0310E−04 | 2.4765E−05 | −1.1489E−06 | 2.3249E−08 |
| S15 | 1.3275E−06 | −3.1164E−08 | 1.6013E−10 | 3.6984E−12 |
| S16 | 4.1244E−06 | −1.9561E−07 | 5.2138E−09 | −5.9154E−11 |

Figure 2A:
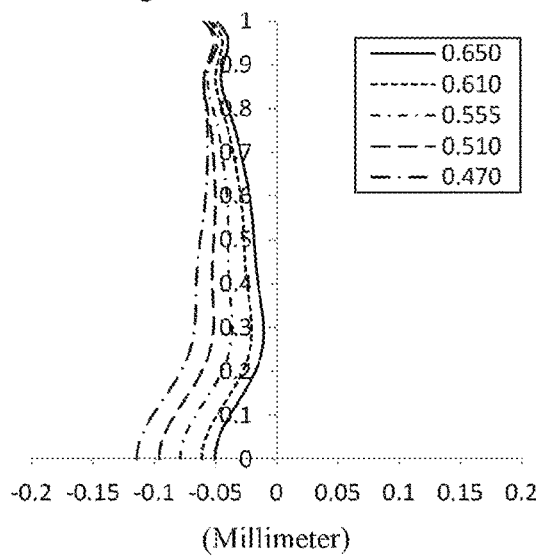
FIG. 2A illustrates a longitudinal aberration curve of the optical imaging system of the Example 1.
Figure 2B:
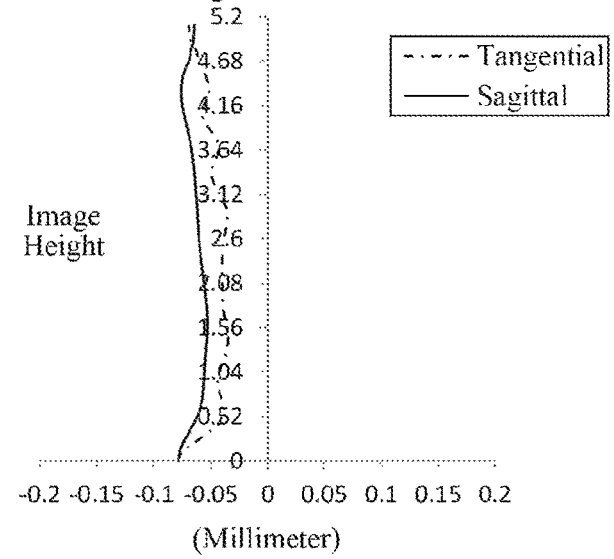
FIG. 2B illustrates an astigmatic curve of the optical imaging system of the Example 1.
Figure 2C:
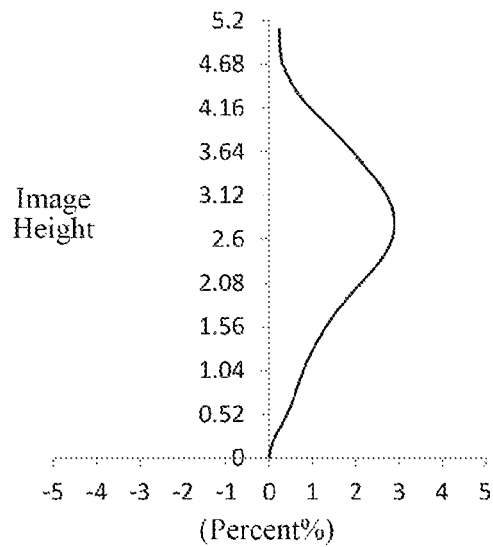
FIG. 2C illustrates a distortion curve of the optical imaging system of the Example 1.
Figure 2D:
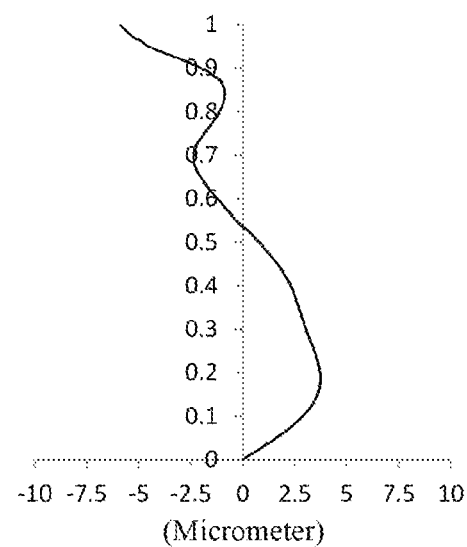
FIG. 2D illustrates a lateral color curve of the optical imaging system of the Example 1.

FIG. 2A illustrates a longitudinal aberration curve of the optical imaging system according to example 1, representing deviations of focal points converged by light of different wavelengths after passing through the optical imaging system. FIG. 2B illustrates an astigmatic curve of the optical imaging system according to example 1, representing a curvature of a tangential plane and a curvature of a sagittal plane. FIG. 2C illustrates a distortion curve of the optical imaging system according to example 1, representing amounts of distortion at different image heights. FIG. 2D illustrates a lateral color curve of the optical imaging system according to example 1, representing deviations of different image heights on an imaging plane after light passes through the optical imaging system. It can be seen from FIG. 2A to FIG. 2D that the optical imaging system provided in example 1 may achieve good image quality.

Example 2

Figure 3:
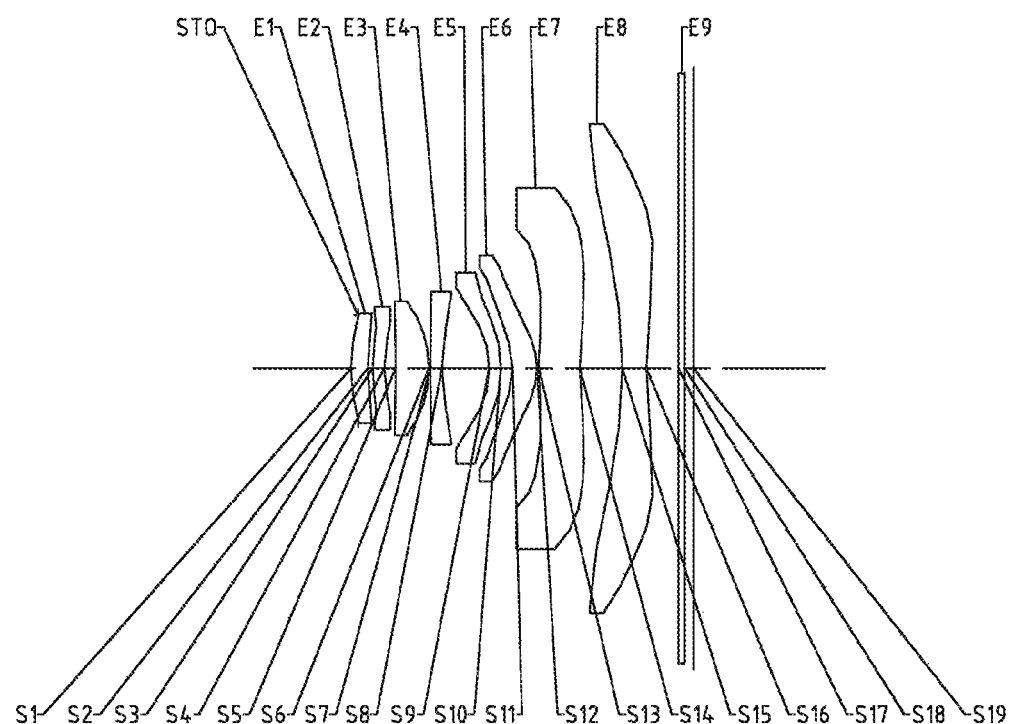
FIG. 3 illustrates a schematic structural view of an optical imaging system according to Example 2 of the present disclosure.

An optical imaging system according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging system according to example 2 of the present disclosure.

As shown in FIG. 3, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 2, a total effective focal length f of the optical imaging system satisfies f=4.28 mm, an axial distance TTL from the object-side surface of the first lens to the imaging plane satisfies TTL=5.87 mm, half of a diagonal length ImgH of an effective pixel area on the imaging plane satisfies ImgH=5.15 mm, and half of a maximal field-of-view Semi-FOV satisfies Semi-FOV=49.2°.

Table 3 shows a table of basic parameters of the optical imaging system in example 2, wherein the units for the radius of curvature, the thickness and the focal length are millimeter (mm). Table 4 shows high-order coefficients applicable to each aspheric surface in example 2, wherein the surface shape of each aspheric surface may be defined by the formula (1) given in the above example 1.

TABLE 3

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.1224 | | | | |
| S1 | aspheric | 2.9136 | 0.2862 | 1.55 | 56.11 | 13.38 | 3.9329 |
| S2 | aspheric | 4.6783 | 0.0847 | | | | −18.9235 |
| S3 | aspheric | 2.8521 | 0.2000 | 1.67 | 20.40 | −19.78 | −2.4352 |
| S4 | aspheric | 2.2787 | 0.1957 | | | | 0.8909 |
| S5 | aspheric | 62.3749 | 0.5678 | 1.76 | 45.60 | 2.65 | 99.0000 |
| S6 | aspheric | −2.0652 | 0.0250 | | | | −0.1734 |
| S7 | aspheric | 5.4825 | 0.2000 | 1.67 | 20.40 | −7.64 | 14.4381 |
| S8 | aspheric | 2.5996 | 0.8076 | | | | −0.4625 |
| S9 | aspheric | −2.0074 | 0.2012 | 1.55 | 56.11 | −15.44 | 0.1891 |
| S10 | aspheric | −2.7278 | 0.2039 | | | | −0.2409 |
| S11 | aspheric | −1.3116 | 0.4160 | 1.55 | 56.11 | 10.37 | −1.0283 |
| S12 | aspheric | −1.1842 | 0.0250 | | | | −1.1097 |
| S13 | aspheric | 4.5000 | 0.7088 | 1.64 | 25.92 | −459.96 | 0.5715 |
| S14 | aspheric | 4.1600 | 0.7305 | | | | −58.5492 |
| S15 | aspheric | −8.9340 | 0.4133 | 1.55 | 23.84 | −6.83 | 1.3344 |
| S16 | aspheric | 6.4995 | 0.5494 | | | | −1.5087 |
| S17 | spherical | infinite | 0.1100 | 1.52 | 64.17 | | |
| S18 | spherical | infinite | 0.1480 | | | | |
| S19 | spherical | infinite | | | | | |

TABLE 4

| Surface number | A4 | A6 | A8 | A10 | A12 |
|---|---|---|---|---|---|
| S1 | −4.8356E−02 | 1.1923E−01 | −9.8362E−01 | 3.9730E+00 | −9.8005E+00 |
| S2 | −6.0044E−03 | −1.5757E−01 | 1.1431E+00 | −5.0220E+00 | 1.3600E+01 |
| S3 | −1.0194E−01 | −2.4478E−02 | −1.2806E−02 | 2.5321E−01 | −1.5442E+00 |

TABLE 4-continued

| | | | | | |
|---|---|---|---|---|---|
| S4 | −9.3747E−02 | −6.5520E−02 | 3.4550E−01 | −1.3946E+00 | 3.3200E+00 |
| S5 | −1.8637E−02 | 6.8530E−03 | −5.2022E−02 | 1.0758E−01 | −1.1761E−02 |
| S6 | −2.1517E−02 | 1.0701E−01 | −4.3324E−01 | 8.6527E−01 | −1.1936E+00 |
| S7 | −1.8014E−01 | 4.1706E−01 | −1.0009E+00 | 1.5932E+00 | −1.7437E+00 |
| S8 | −1.8791E−01 | 2.9822E−01 | −4.7492E−01 | 5.2741E−01 | −3.9732E−01 |
| S9 | −2.3179E−01 | 3.7923E−01 | −6.7180E−01 | 1.1037E+00 | −1.1378E+00 |
| S10 | −2.0423E−01 | 3.5864E−01 | −4.8025E−01 | 4.3436E−01 | −1.9908E−01 |
| S11 | 1.8755E−01 | −3.3059E−02 | −1.3946E−01 | 2.0175E−01 | −1.3997E−01 |
| S12 | 1.3394E−01 | −1.2258E−01 | 1.0545E−01 | −3.4120E−02 | −9.2751E−03 |
| S13 | −7.6605E−02 | −1.9902E−02 | 5.0229E−02 | −3.3279E−02 | 1.2516E−02 |
| S14 | −6.6128E−03 | −1.8769E−02 | 1.5167E−02 | −5.7075E−03 | 1.2666E−03 |
| S15 | −1.7320E−03 | 1.4203E−03 | −1.4786E−04 | −5.3944E−05 | 1.7262E−05 |
| S16 | −2.4731E−02 | 5.9788E−03 | −1.0352E−03 | 9.7730E−05 | −5.5131E−06 |

| Surface number | A14 | A16 | A18 | A20 |
|---|---|---|---|---|
| S1 | 1.4966E+01 | −1.3787E+01 | 7.0109E+00 | −1.5093E+00 |
| S2 | −2.2671E+01 | 2.2589E+01 | −1.2208E+01 | 2.7076E+00 |
| S3 | 4.4329E+00 | −6.8738E+00 | 5.5168E+00 | −1.8169E+00 |
| S4 | −4.8663E+00 | 4.2837E+00 | −2.0842E+00 | 4.2728E−01 |
| S5 | −3.2157E−01 | 5.5411E−01 | −3.7773E−01 | 9.4360E−02 |
| S6 | 1.1882E+00 | −8.0331E−01 | 3.2304E−01 | −5.6367E−02 |
| S7 | 1.2994E+00 | −6.1931E−01 | 1.6845E−01 | −1.9887E−02 |
| S8 | 1.9549E−01 | −5.4651E−02 | 6.1238E−03 | 1.6063E−04 |
| S9 | 7.4906E−01 | −3.2165E−01 | 8.3403E−02 | −9.8549E−03 |
| S10 | 2.9226E−02 | 9.2920E−03 | −4.0430E−03 | 4.3040E−04 |
| S11 | 5.7196E−02 | −1.3812E−02 | 1.7613E−03 | −8.5752E−05 |
| S12 | 1.1335E−02 | −3.8554E−03 | 6.0125E−04 | −3.6489E−05 |
| S13 | −2.9804E−03 | 4.4591E−04 | −3.8252E−05 | 1.4298E−06 |
| S14 | −1.7691E−04 | 1.5413E−05 | −7.6942E−07 | 1.6828E−08 |
| S15 | −2.0495E−06 | 1.2272E−07 | −3.7058E−09 | 4.5017E−11 |
| S16 | 2.3556E−07 | −8.7856E−09 | 2.0912E−10 | −1.7636E−12 |

Figure 4A:
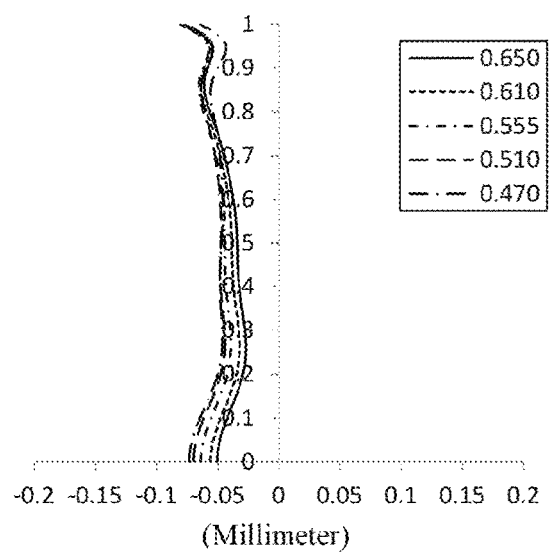
FIG. 4A illustrates a longitudinal aberration curve of the optical imaging system of the Example 2.
Figure 4B:
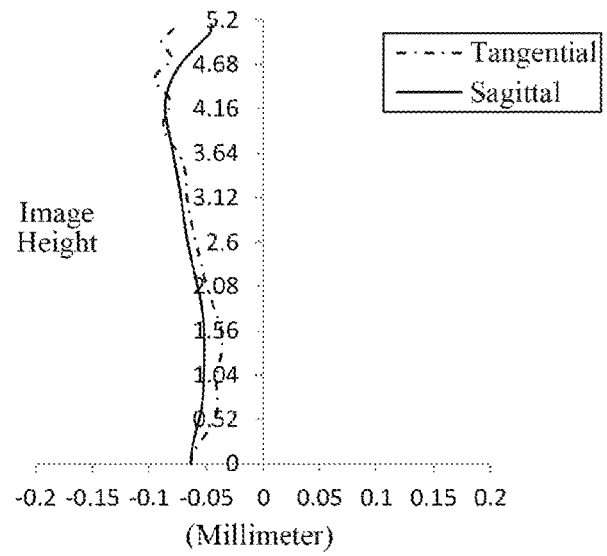
FIG. 4B illustrates an astigmatic curve of the optical imaging system of the Example 2.
Figure 4C:
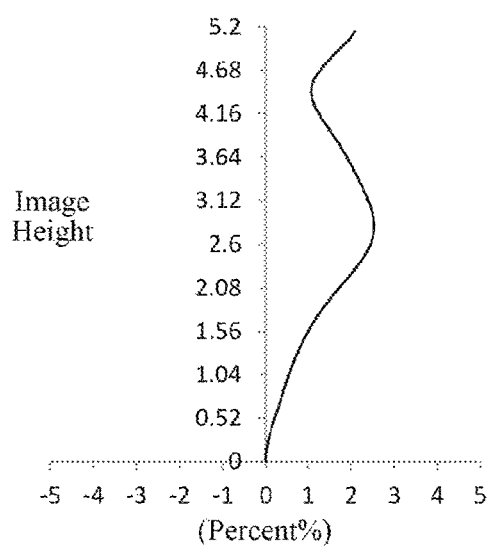
FIG. 4C illustrates a distortion curve of the optical imaging system of the Example 2.
Figure 4D:
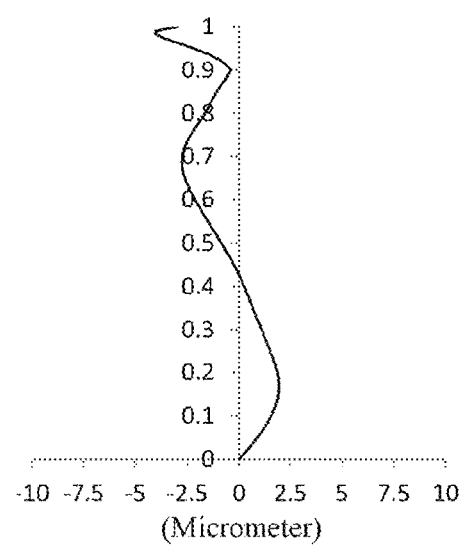
FIG. 4D illustrates a lateral color curve of the optical imaging system of the Example 2.

FIG. 4A illustrates a longitudinal aberration curve of the optical imaging system according to example 2, representing deviations of focal points converged by light of different wavelengths after passing through the optical imaging system. FIG. 4B illustrates an astigmatic curve of the optical imaging system according to example 2, representing a curvature of a tangential plane and a curvature of a sagittal plane. FIG. 4C illustrates a distortion curve of the optical imaging system according to example 2, representing amounts of distortion at different image heights. FIG. 4D illustrates a lateral color curve of the optical imaging system according to example 2, representing deviations of different image heights on an imaging plane after light passes through the optical imaging system. It can be seen from FIG. 4A to FIG. 4D that the optical imaging system provided in example 2 may achieve good image quality.

Example 3

Figure 5:
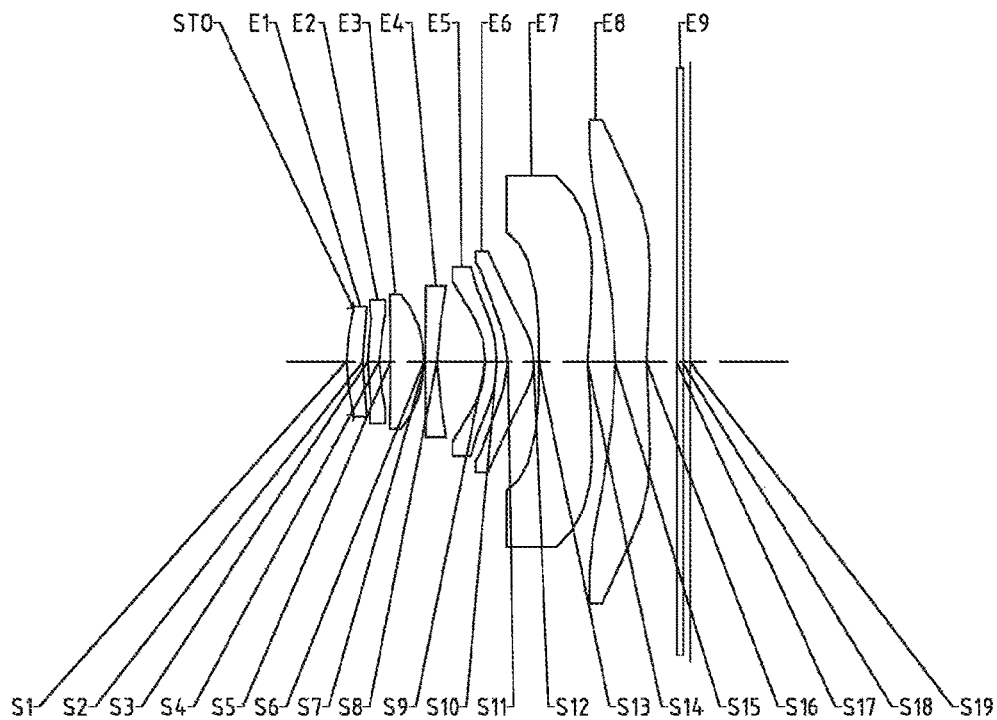
FIG. 5 illustrates a schematic structural view of an optical imaging system according to Example 3 of the present disclosure.

An optical imaging system according to example 3 of the present disclosure is described below with reference to FIG. 5 to FIG. 6D. FIG. 5 shows a schematic structural view of the optical imaging system according to example 3 of the present disclosure.

As shown in FIG. 5, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a negative refractive power. An object-side surface S13 of the seventh lens E7 is a concave surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 3, a total effective focal length f of the optical imaging system satisfies f=4.31 mm, an axial distance TTL from the object-side surface of the first lens to the imaging plane TTL=5.95 mm, half of a diagonal length ImgH of an effective pixel area on the imaging plane ImgH=5.15 mm, and half of a maximal field-of-view Semi-FOV satisfies Semi-FOV=48.9°.

Table 5 shows a table of basic parameters of the optical imaging system in example 3, wherein the units for the radius of curvature, the thickness and the focal length are millimeter (mm). Table 6 shows high-order coefficients applicable to each aspheric surface in example 3, wherein the surface shape of each aspheric surface may be defined by the formula (1) given in the above example 1.

TABLE 5

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.1199 | | | | |
| S1 | aspheric | 2.9106 | 0.2814 | 1.55 | 56.11 | 14.54 | 3.7439 |
| S2 | aspheric | 4.4396 | 0.0822 | | | | −21.6835 |
| S3 | aspheric | 2.7694 | 0.2000 | 1.67 | 20.40 | −23.46 | −2.5442 |
| S4 | aspheric | 2.2844 | 0.1960 | | | | 0.9292 |
| S5 | aspheric | 62.1565 | 0.5793 | 1.76 | 45.60 | 2.64 | 60.6255 |
| S6 | aspheric | −2.0602 | 0.0250 | | | | −0.0962 |
| S7 | aspheric | 5.5243 | 0.2000 | 1.67 | 20.40 | −8.15 | 14.3792 |
| S8 | aspheric | 2.6984 | 0.8369 | | | | −0.3514 |
| S9 | aspheric | −2.0173 | 0.1979 | 1.55 | 56.11 | −16.44 | 0.1641 |
| S10 | aspheric | −2.6922 | 0.1885 | | | | −0.1822 |
| S11 | aspheric | −1.3420 | 0.4581 | 1.55 | 56.11 | 4.57 | −0.9724 |
| S12 | aspheric | −0.9778 | 0.0854 | | | | −1.3027 |
| S13 | aspheric | −1250.0000 | 0.8421 | 1.64 | 25.92 | −6.10 | −99.0000 |
| S14 | aspheric | 3.9078 | 0.4815 | | | | −58.5492 |
| S15 | aspheric | −9.8104 | 0.5419 | 1.55 | 23.84 | −8.37 | 1.8401 |
| S16 | aspheric | 8.7133 | 0.5236 | | | | 0.7292 |
| S17 | spherical | infinite | 0.1100 | 1.52 | 64.17 | | |
| S18 | spherical | infinite | 0.1202 | | | | |
| S19 | spherical | infinite | | | | | |

TABLE 6

| Surface number | A4 | A6 | A8 | A10 | A12 |
|---|---|---|---|---|---|
| S1 | −4.9453E−02 | 1.0835E−01 | −8.6443E−01 | 3.3474E+00 | −8.0281E+00 |
| S2 | −1.0766E−02 | −9.2950E−02 | 8.0326E−01 | −3.8524E+00 | 1.0746E+01 |
| S3 | −1.1103E−01 | 2.2992E−02 | −1.3389E−01 | 4.9935E−01 | −2.0008E+00 |
| S4 | −1.0136E−01 | −2.0777E−02 | 1.4712E−01 | −7.3606E−01 | 1.8114E+00 |
| S5 | −1.9834E−02 | 2.3644E−02 | −1.1219E−01 | 2.5704E−01 | −3.3735E−01 |
| S6 | −4.0014E−02 | 2.3350E−01 | −8.4432E−01 | 1.6519E+00 | −2.1459E+00 |
| S7 | −1.9771E−01 | 5.3781E−01 | −1.3577E+00 | 2.1722E+00 | −2.3370E+00 |
| S8 | −1.8523E−01 | 3.0885E−01 | −4.7836E−01 | 4.5628E−01 | −2.3119E−01 |
| S9 | −2.7311E−01 | 4.6339E−01 | −8.1992E−01 | 1.3328E+00 | −1.3660E+00 |
| S10 | −1.9305E−01 | 3.7397E−01 | −5.7205E−01 | 5.6980E−01 | −2.9867E−01 |
| S11 | 1.5034E−01 | 6.0481E−02 | −2.9910E−01 | 3.7384E−01 | −2.5671E−01 |
| S12 | 1.4876E−01 | −1.3843E−01 | 1.2493E−01 | −5.1036E−02 | −1.5400E−03 |
| S13 | −4.0588E−03 | −6.6809E−02 | 8.6492E−02 | −5.9051E−02 | 2.4868E−02 |
| S14 | −2.1167E−02 | 2.3467E−03 | 2.3495E−03 | −1.3621E−03 | 3.5534E−04 |
| S15 | −8.8333E−04 | 1.2874E−03 | −1.9145E−04 | −3.3018E−05 | 1.3395E−05 |
| S16 | −2.2768E−02 | 4.1200E−03 | −1.9431E−04 | −1.1354E−04 | 2.4842E−05 |

| Surface number | A14 | A16 | A18 | A20 |
|---|---|---|---|---|
| S1 | 1.1961E+01 | −1.0750E+01 | 5.3169E+00 | −1.1070E+00 |
| S2 | −1.8070E+01 | 1.7989E+01 | −9.6824E+00 | 2.1446E+00 |
| S3 | 5.0281E+00 | −7.2459E+00 | 5.4807E+00 | −1.7022E+00 |
| S4 | −2.6128E+00 | 2.2072E+00 | −1.0125E+00 | 1.9157E−01 |
| S5 | 2.0219E−01 | 3.2342E−02 | −9.3659E−02 | 2.9603E−02 |
| S6 | 1.9190E+00 | −1.1411E+00 | 4.0613E−01 | −6.4427E−02 |
| S7 | 1.6965E+00 | −7.8619E−01 | 2.0740E−01 | −2.3530E−02 |
| S8 | 1.6443E−02 | 5.2418E−02 | −2.8469E−02 | 4.8904E−03 |
| S9 | 8.8257E−01 | −3.6532E−01 | 9.0496E−02 | −1.0256E−02 |
| S10 | 6.9309E−02 | 8.4797E−04 | −3.3136E−03 | 4.3054E−04 |
| S11 | 1.0842E−01 | −2.8151E−02 | 4.0984E−03 | −2.5365E−04 |
| S12 | 9.9316E−03 | −4.0082E−03 | 6.9574E−04 | −4.6367E−05 |
| S13 | −6.6953E−03 | 1.1217E−03 | −1.0639E−04 | 4.3553E−06 |
| S14 | −5.4608E−05 | 5.0662E−06 | −2.6239E−07 | 5.8164E−09 |
| S15 | −1.6672E−06 | 1.0170E−07 | −3.1006E−09 | 3.7900E−11 |
| S16 | −2.3010E−06 | 1.1319E−07 | −2.9245E−09 | 3.1607E−11 |

Figure 6A:
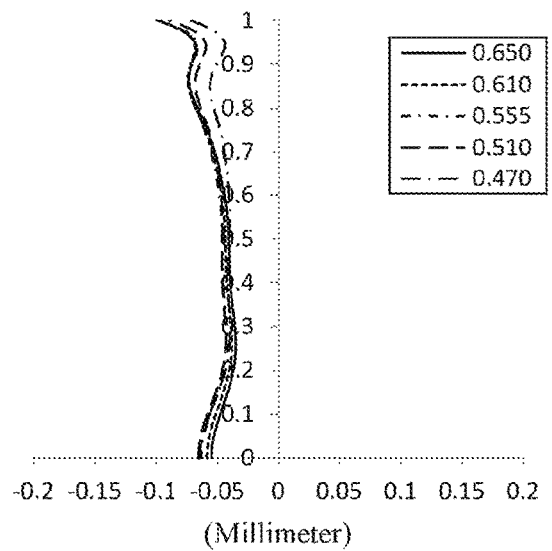
FIG. 6A illustrates a longitudinal aberration curve of the optical imaging system of the Example 3.
Figure 6B:
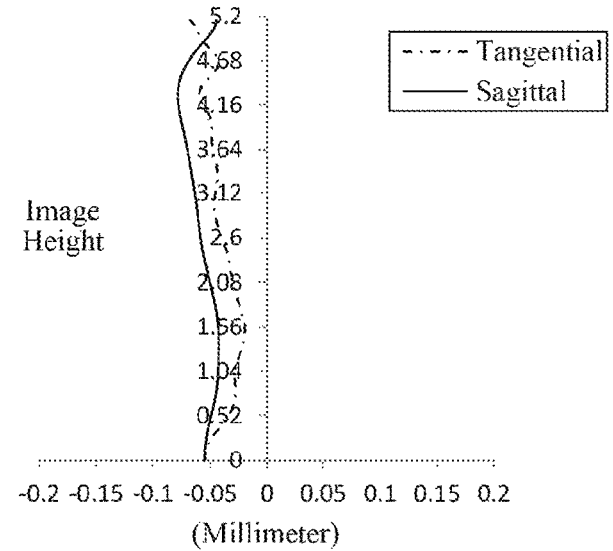
FIG. 6B illustrates an astigmatic curve of the optical imaging system of the Example 3.

FIG. 6A illustrates a longitudinal aberration curve of the optical imaging system according to example 3, representing deviations of focal points converged by light of different wavelengths after passing through the optical imaging system. FIG. 6B illustrates an astigmatic curve of the optical imaging system according to example 3, representing a curvature of a tangential plane and a curvature of a sagittal plane. FIG. 6C illustrates a distortion curve of the optical imaging system according to example 3, representing amounts of distortion at different image heights. FIG. 6D illustrates a lateral color curve of the optical imaging system according to example 3, representing deviations of different image heights on an imaging plane after light passes through the optical imaging system. It can be seen from FIG. 6A to FIG. 6D that the optical imaging system provided in example 3 may achieve good image quality.

Example 4

An optical imaging system according to example 4 of the present disclosure is described below with reference to FIG. 7 to FIG. 8D. FIG. 7 shows a schematic structural view of the optical imaging system according to example 4 of the present disclosure.

As shown in FIG. 7, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a positive refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 4, a total effective focal length f of the optical imaging system satisfies f=3.80 mm, an axial distance TTL from the object-side surface of the first lens to the imaging plane satisfies TTL=5.71 mm, half of a diagonal length ImgH of an effective pixel area on the imaging plane satisfies ImgH=4.95 mm, and half of a maximal field-of-view Semi-FOV satisfies Semi-FOV=51.7°.

Table 7 shows a table of basic parameters of the optical imaging system in example 4, wherein the units for the radius of curvature, the thickness and the focal length are millimeter (mm). Table 8 shows high-order coefficients applicable to each aspheric surface in example 4, wherein the surface shape of each aspheric surface may be defined by the formula (1) given in the above example 1.

TABLE 7

| Surface number | Surface type | Radius of curvature | Thickness | Material Refractive index | Material Abbe number | Focal length | Conic coefficient |
|---|---|---|---|---|---|---|---|
| OBJ | spherical | infinite | infinite | | | | |
| STO | spherical | infinite | −0.1321 | | | | |
| S1 | aspheric | 2.9922 | 0.2878 | 1.55 | 56.11 | 17.79 | 4.1736 |
| S2 | aspheric | 4.1776 | 0.0651 | | | | −22.7947 |
| S3 | aspheric | 2.6551 | 0.2000 | 1.67 | 20.40 | −40.69 | −3.0432 |
| S4 | aspheric | 2.3453 | 0.1958 | | | | 1.1493 |
| S5 | aspheric | 51.0432 | 0.5709 | 1.76 | 45.60 | 2.69 | 99.0000 |
| S6 | aspheric | −2.1121 | 0.0250 | | | | −0.3920 |
| S7 | aspheric | 5.3459 | 0.2000 | 1.67 | 20.40 | −7.14 | 13.2090 |
| S8 | aspheric | 2.4790 | 0.7212 | | | | −0.7086 |
| S9 | aspheric | −2.7500 | 0.2124 | 1.55 | 56.11 | 104.72 | 0.1895 |
| S10 | aspheric | −2.6954 | 0.2178 | | | | −0.3365 |
| S11 | aspheric | −1.1223 | 0.4582 | 1.55 | 56.11 | 126.95 | −1.2850 |
| S12 | aspheric | −1.2636 | 0.0250 | | | | −0.9712 |
| S13 | aspheric | 2.8757 | 0.9191 | 1.64 | 25.92 | 11.55 | −0.7409 |
| S14 | aspheric | 4.1259 | 0.3845 | | | | −58.5492 |
| S15 | aspheric | −8.8071 | 0.3643 | 1.55 | 23.84 | −5.93 | 1.1841 |
| S16 | aspheric | 5.1947 | 0.5760 | | | | −1.2969 |
| S17 | spherical | infinite | 0.1100 | 1.52 | 64.17 | | |
| S18 | spherical | infinite | 0.1771 | | | | |
| S19 | spherical | infinite | | | | | |

TABLE 8

| Surface number | A4 | A6 | A8 | A10 | A12 |
|---|---|---|---|---|---|
| S1 | −5.1905E−02 | 2.2976E−01 | −1.4949E+00 | 5.2960E+00 | −1.1585E+01 |
| S2 | −7.7110E−03 | −2.6584E−01 | 2.2247E+00 | −9.2657E+00 | 2.2466E+01 |
| S3 | −1.3507E−01 | 1.1040E−01 | −4.3696E−01 | 1.7459E+00 | −5.6647E+00 |

TABLE 8-continued

| | | | | |
|---|---|---|---|---|
| S4 | −9.8855E−02 | −8.1438E−02 | 5.7646E−01 | −2.1475E+00 | 4.5333E+00 |
| S5 | −2.2553E−02 | 8.8685E−02 | −4.8518E−01 | 1.4363E+00 | −2.5995E+00 |
| S6 | 1.5466E−02 | −5.2121E−02 | −1.7803E−05 | 1.4620E−01 | −4.6272E−01 |
| S7 | −1.5117E−01 | 2.9360E−01 | −7.3061E−01 | 1.2021E+00 | −1.3263E+00 |
| S8 | −1.8347E−01 | 2.9855E−01 | −4.9396E−01 | 5.8217E−01 | −4.6478E−01 |
| S9 | −2.5528E−01 | 6.6043E−01 | −1.5420E+00 | 2.3399E+00 | −2.1344E+00 |
| S10 | −2.4370E−01 | 5.9817E−01 | −1.0662E+00 | 1.2106E+00 | −8.1561E−01 |
| S11 | 2.4142E−01 | −2.6053E−01 | 3.1201E−01 | −3.0028E−01 | 2.0295E−01 |
| S12 | 1.2416E−01 | −2.1766E−01 | 3.2274E−01 | −2.7419E−01 | 1.4387E−01 |
| S13 | −1.4163E−01 | 5.6751E−02 | −1.4090E−02 | 6.0707E−04 | 5.4842E−04 |
| S14 | −1.2251E−02 | −6.9276E−03 | 6.4549E−03 | −2.4023E−03 | 5.0806E−04 |
| S15 | −7.3192E−03 | 9.7159E−03 | −4.1575E−03 | 9.1834E−04 | −1.1646E−04 |
| S16 | −2.0838E−02 | 1.6709E−03 | 6.8252E−04 | −3.1267E−04 | 5.3106E−05 |

| Surface number | A14 | A16 | A18 | A20 |
|---|---|---|---|---|
| S1 | 1.5686E+01 | −1.2782E+01 | 5.7208E+00 | −1.0759E+00 |
| S2 | −3.3094E+01 | 2.8958E+01 | −1.3707E+01 | 2.6574E+00 |
| S3 | 1.1674E+01 | −1.4294E+01 | 9.4816E+00 | −2.6306E+00 |
| S4 | −5.7836E+00 | 4.3774E+00 | −1.8008E+00 | 3.0586E−01 |
| S5 | 2.9541E+00 | −2.0705E+00 | 8.2882E−01 | −1.4703E−01 |
| S6 | 7.6766E−01 | −6.9874E−01 | 3.3075E−01 | −6.3370E−02 |
| S7 | 9.7548E−01 | −4.5394E−01 | 1.2025E−01 | −1.3843E−02 |
| S8 | 2.4510E−01 | −8.0676E−02 | 1.4926E−02 | −1.1799E−03 |
| S9 | 1.2126E+00 | −4.2883E−01 | 8.7407E−02 | −7.8887E−03 |
| S10 | 3.3273E−01 | −8.1818E−02 | 1.1300E−02 | −6.8418E−04 |
| S11 | −9.0401E−02 | 2.5073E−02 | −3.9313E−03 | 2.6681E−04 |
| S12 | −4.7505E−02 | 9.5877E−03 | −1.0795E−03 | 5.1959E−05 |
| S13 | −1.1111E−04 | −2.3149E−06 | 2.3682E−06 | −1.6140E−07 |
| S14 | −6.6154E−05 | 5.2743E−06 | −2.3793E−07 | 4.6896E−09 |
| S15 | 8.8385E−06 | −3.9775E−07 | 9.8223E−09 | −1.0298E−10 |
| S16 | −4.6810E−06 | 2.2579E−07 | −5.6135E−09 | 5.5625E−11 |

Figure 8A:
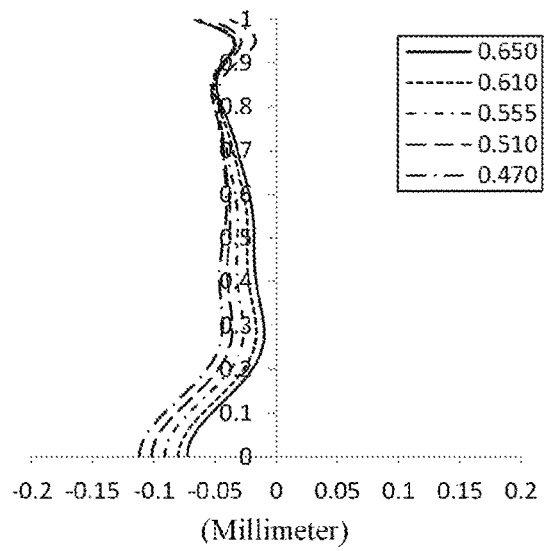
FIG. 8A illustrates a longitudinal aberration curve of the optical imaging system of the Example 4.
Figure 8B:
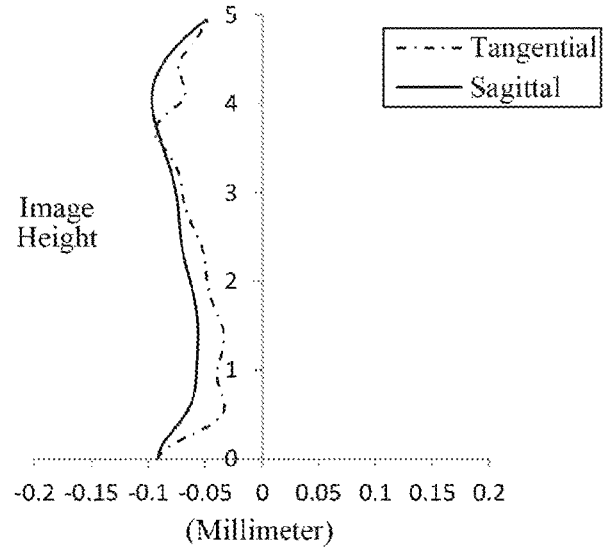
FIG. 8B illustrates an astigmatic curve of the optical imaging system of the Example 4.
Figure 8C:
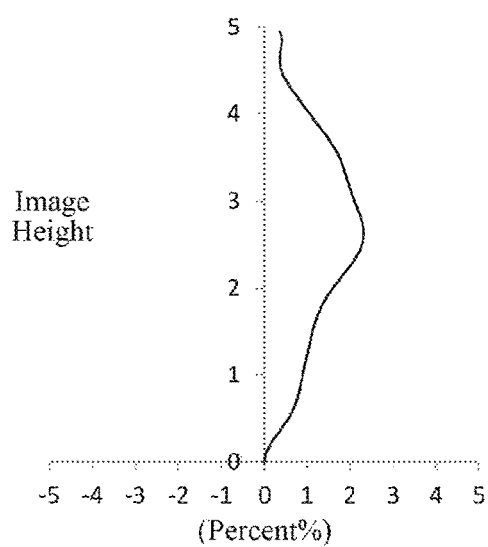
FIG. 8C illustrates a distortion curve of the optical imaging system of the Example 4.
Figure 8D:
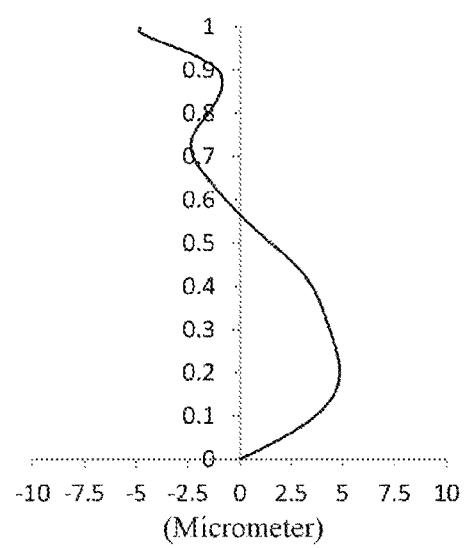
FIG. 8D illustrates a lateral color curve of the optical imaging system of the Example 4.

FIG. 8A illustrates a longitudinal aberration curve of the optical imaging system according to example 4, representing deviations of focal points converged by light of different wavelengths after passing through the optical imaging system. FIG. 8B illustrates an astigmatic curve of the optical imaging system according to example 4, representing a curvature of a tangential plane and a curvature of a sagittal plane. FIG. 8C illustrates a distortion curve of the optical imaging system according to example 4, representing amounts of distortion at different image heights. FIG. 8D illustrates a lateral color curve of the optical imaging system according to example 4, representing deviations of different image heights on an imaging plane after light passes through the optical imaging system. It can be seen from FIG. 8A to FIG. 8D that the optical imaging system provided in example 4 may achieve good image quality.

Example 5

Figure 9:
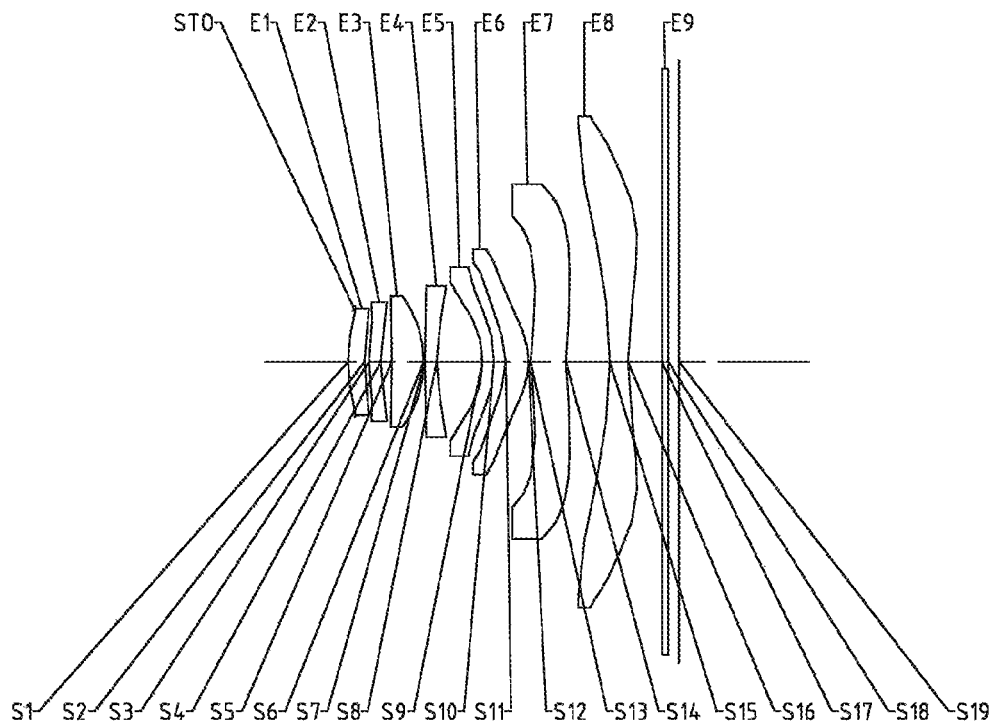
FIG. 9 illustrates a schematic structural view of an optical imaging system according to Example 5 of the present disclosure.

An optical imaging system according to example 5 of the present disclosure is described below with reference to FIG. 9 to FIG. 10D. FIG. 9 shows a schematic structural view of the optical imaging system according to example 5 of the present disclosure.

As shown in FIG. 9, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 5, a total effective focal length f of the optical imaging system satisfies f=4.18 mm, an axial distance TTL from the object-side surface of the first lens to the imaging plane satisfies TTL=5.75 mm, half of a diagonal length ImgH of an effective pixel area on the imaging plane satisfies ImgH=5.20 mm, and half of a maximal field-of-view Semi-FOV satisfies Semi-FOV=50.0°.

Table 9 shows a table of basic parameters of the optical imaging system in example 5, wherein the units for the radius of curvature, the thickness and the focal length are millimeter (mm). Table 10 shows high-order coefficients applicable to each aspheric surface in example 5, wherein the surface shape of each aspheric surface may be defined by the formula (1) given in the above example 1.

TABLE 9

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.1178 | | | | |
| S1 | aspheric | 2.9292 | 0.2845 | 1.55 | 56.11 | 13.10 | 4.0239 |
| S2 | aspheric | 4.7915 | 0.0793 | | | | −15.5528 |
| S3 | aspheric | 2.8904 | 0.2000 | 1.67 | 20.40 | −18.79 | −2.2937 |
| S4 | aspheric | 2.2829 | 0.1941 | | | | 0.8549 |
| S5 | aspheric | 62.1900 | 0.5526 | 1.76 | 45.60 | 2.65 | 99.0000 |
| S6 | aspheric | −2.0649 | 0.0250 | | | | −0.2103 |
| S7 | aspheric | 5.4637 | 0.2000 | 1.67 | 20.40 | −7.38 | 14.4406 |
| S8 | aspheric | 2.5496 | 0.7948 | | | | −0.4769 |
| S9 | aspheric | −1.9979 | 0.2000 | 1.55 | 56.11 | −15.29 | 0.2024 |
| S10 | aspheric | −2.7195 | 0.2065 | | | | −0.2067 |
| S11 | aspheric | −1.3060 | 0.3937 | 1.55 | 56.11 | 20.55 | −1.0544 |
| S12 | aspheric | −1.2944 | 0.0381 | | | | −1.0066 |
| S13 | aspheric | 3.0091 | 0.6125 | 1.64 | 25.92 | 14.05 | −0.6616 |
| S14 | aspheric | 4.1678 | 0.7605 | | | | −58.5492 |
| S15 | aspheric | −8.9775 | 0.3170 | 1.55 | 23.84 | −6.16 | 1.2497 |
| S16 | aspheric | 5.4472 | 0.5884 | | | | −1.7979 |
| S17 | spherical | infinite | 0.1100 | 1.52 | 64.17 | | |
| S18 | spherical | infinite | 0.1896 | | | | |
| S19 | spherical | infinite | | | | | |

TABLE 10

| Surface number | A4 | A6 | A8 | A10 | A12 |
|---|---|---|---|---|---|
| S1 | −5.1196E−02 | 1.8924E−01 | −1.6548E+00 | 7.4876E+00 | −2.0730E+01 |
| S2 | −4.0158E−03 | −2.2030E−01 | 1.5675E+00 | −6.8570E+00 | 1.9076E+01 |
| S3 | −9.5960E−02 | −1.2155E−01 | 7.6559E−01 | −3.6908E+00 | 1.0909E+01 |
| S4 | −8.9108E−02 | −1.0498E−01 | 5.6499E−01 | −2.1995E+00 | 5.2476E+00 |
| S5 | −1.8743E−02 | 4.6749E−03 | −4.5535E−02 | 8.0885E−02 | 1.3472E−01 |
| S6 | −1.1037E−02 | 6.4339E−03 | −3.0850E−02 | −7.8349E−02 | 2.1715E−01 |
| S7 | −1.7172E−01 | 3.4851E−01 | −8.0926E−01 | 1.3146E+00 | −1.4997E+00 |
| S8 | −1.8524E−01 | 2.8380E−01 | −4.7214E−01 | 5.9380E−01 | −5.4437E−01 |
| S9 | −2.1408E−01 | 3.9260E−01 | −8.5902E−01 | 1.6264E+00 | −1.9174E+00 |
| S10 | −1.9699E−01 | 2.8362E−01 | −2.8261E−01 | 1.7768E−01 | −8.5110E−03 |
| S11 | 2.1502E−01 | −1.4951E−01 | 1.3956E−01 | −1.6962E−01 | 1.5346E−01 |
| S12 | 1.3426E−01 | −1.5675E−01 | 1.9861E−01 | −1.5235E−01 | 7.4387E−02 |
| S13 | −1.0421E−01 | −1.9820E−03 | 3.2087E−02 | −1.9103E−02 | 5.9635E−03 |
| S14 | 4.6482E−03 | −4.1077E−02 | 3.0661E−02 | −1.1332E−02 | 2.4856E−03 |
| S15 | −1.6422E−03 | 6.9376E−04 | 2.9175E−04 | −1.7104E−04 | 3.4231E−05 |
| S16 | −2.6446E−02 | 7.9362E−03 | −1.9287E−03 | 2.9885E−04 | −3.1231E−05 |

| Surface number | A14 | A16 | A18 | A20 |
|---|---|---|---|---|
| S1 | 3.5735E+01 | −3.7397E+01 | 2.1752E+01 | −5.3941E+00 |
| S2 | −3.3354E+01 | 3.5549E+01 | −2.0978E+01 | 5.2134E+00 |
| S3 | −1.9702E+01 | 2.1052E+01 | −1.2145E+01 | 2.8665E+00 |
| S4 | −7.8187E+00 | 7.0632E+00 | −3.5536E+00 | 7.6065E−01 |
| S5 | −7.1079E−01 | 1.0596E+00 | −7.0009E−01 | 1.7581E−01 |
| S6 | −1.5772E−01 | −2.3005E−02 | 7.7240E−02 | −2.4698E−02 |
| S7 | 1.1703E+00 | −5.8524E−01 | 1.6855E−01 | −2.1462E−02 |
| S8 | 3.5250E−01 | −1.5052E−01 | 3.8292E−02 | −4.4256E−03 |
| S9 | 1.4265E+00 | −6.6273E−01 | 1.7539E−01 | −2.0114E−02 |
| S10 | −5.5079E−02 | 3.1102E−02 | −7.0458E−03 | 5.9569E−04 |
| S11 | −8.4780E−02 | 2.7528E−02 | −4.8932E−03 | 3.6939E−04 |
| S12 | −2.3584E−02 | 4.7093E−03 | −5.4268E−04 | 2.7817E−05 |
| S13 | −1.1665E−03 | 1.4693E−04 | −1.1064E−05 | 3.7777E−07 |
| S14 | −3.4191E−04 | 2.9217E−05 | −1.4275E−06 | 3.0584E−08 |
| S15 | −3.4765E−06 | 1.9228E−07 | −5.5312E−09 | 6.5003E−11 |
| S16 | 2.1990E−06 | −9.7372E−08 | 2.3850E−09 | −2.4137E−11 |

Figure 10A:
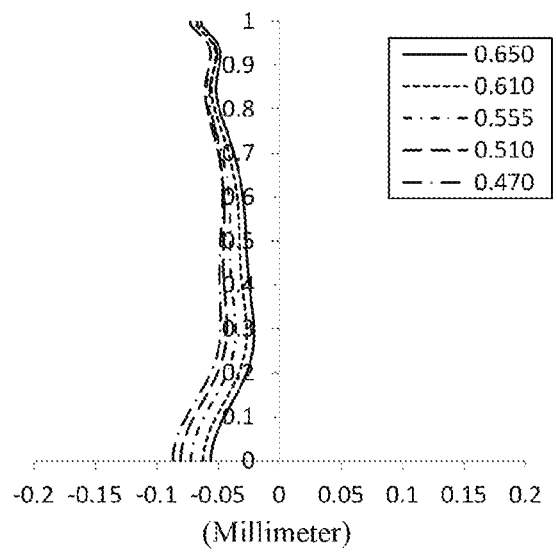
FIG. 10A illustrates a longitudinal aberration curve of the optical imaging system of the Example 5.
Figure 10B:
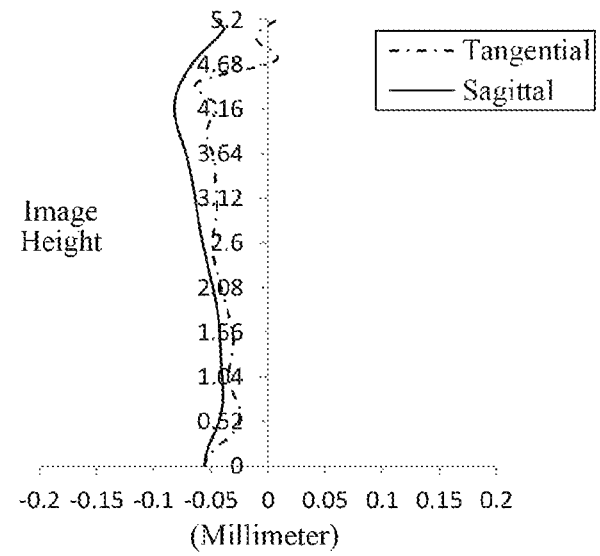
FIG. 10B illustrates an astigmatic curve of the optical imaging system of the Example 5.
Figure 10C:
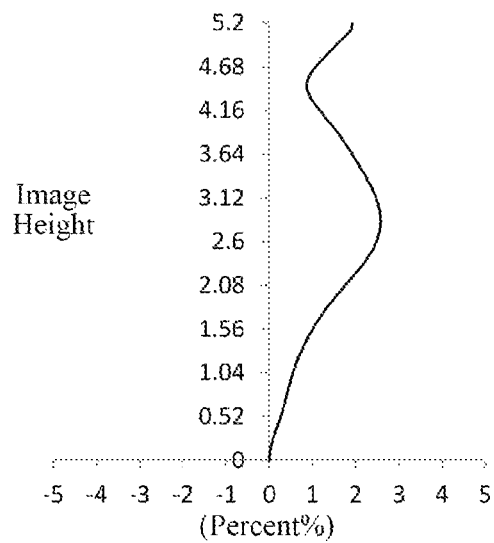
FIG. 10C illustrates a distortion curve of the optical imaging system of the Example 5.
Figure 10D:
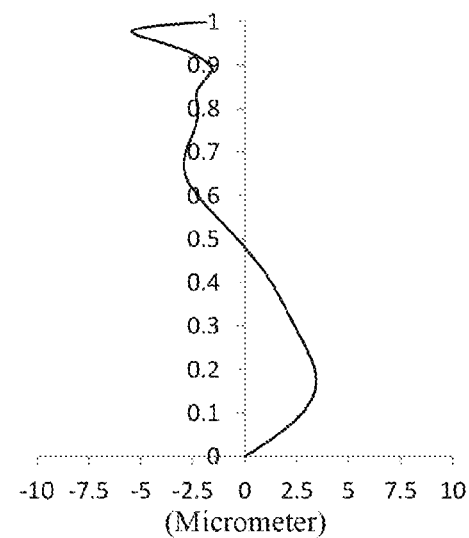
FIG. 10D illustrates a lateral color curve of the optical imaging system of the Example 5.

FIG. 10A illustrates a longitudinal aberration curve of the optical imaging system according to example 5, representing deviations of focal points converged by light of different wavelengths after passing through the optical imaging system. FIG. 10B illustrates an astigmatic curve of the optical imaging system according to example 5, representing a curvature of a tangential plane and a curvature of a sagittal plane. FIG. 10C illustrates a distortion curve of the optical imaging system according to example 5, representing amounts of distortion at different image heights. FIG. 10D illustrates a lateral color curve of the optical imaging system according to example 5, representing deviations of different image heights on an imaging plane after light passes through the optical imaging system. It can be seen from FIG. 10A to FIG. 10D that the optical imaging system provided in example 5 may achieve good image quality.

Example 6

Figure 11:
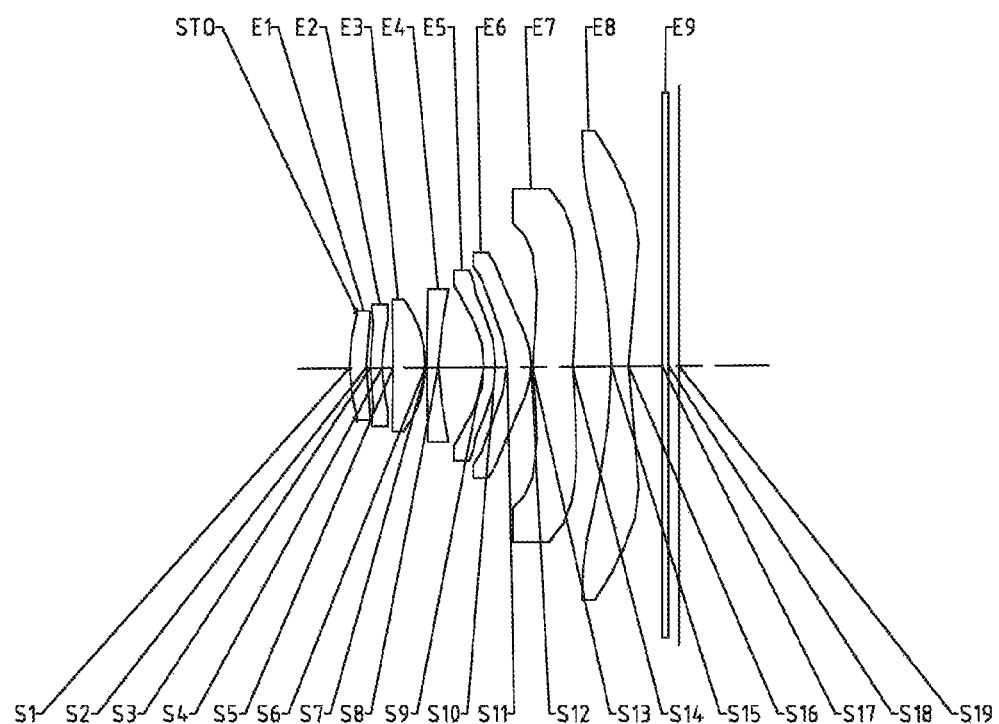
FIG. 11 illustrates a schematic structural view of an optical imaging system according to Example 6 of the present disclosure.

An optical imaging system according to example 6 of the present disclosure is described below with reference to FIG. 11 to FIG. 12D. FIG. 11 shows a schematic structural view of the optical imaging system according to example 6 of the present disclosure.

As shown in FIG. 11, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 6, a total effective focal length f of the optical imaging system satisfies f=4.11 mm, an axial distance TTL from the object-side surface of the first lens to the imaging plane satisfies TTL=5.72 mm, half of a diagonal length ImgH of an effective pixel area on the imaging plane satisfies ImgH=4.85 mm, and half of a maximal field-of-view Semi-FOV satisfies Semi-FOV=49.1°.

Table 11 shows a table of basic parameters of the optical imaging system in example 6, wherein the units for the radius of curvature, the thickness and the focal length are millimeter (mm). Table 12 shows high-order coefficients applicable to each aspheric surface in example 6, wherein the surface shape of each aspheric surface may be defined by the formula (1) given in the above example 1.

TABLE 11

| Surface number | Surface type | Radius of curvature | Thickness | Refractive index | Abbe number | Focal length | Conic coefficient |
|---|---|---|---|---|---|---|---|
| OBJ | spherical | infinite | infinite | | | | |
| STO | spherical | infinite | −0.1257 | | | | |
| S1 | aspheric | 2.9119 | 0.2899 | 1.55 | 56.11 | 12.88 | 4.0835 |
| S2 | aspheric | 4.7946 | 0.0690 | | | | −16.9880 |
| S3 | aspheric | 2.9019 | 0.2013 | 1.67 | 20.40 | −17.84 | −2.4630 |
| S4 | aspheric | 2.2674 | 0.1956 | | | | 0.8695 |
| S5 | aspheric | 52.4506 | 0.5587 | 1.76 | 45.60 | 2.64 | 87.1764 |
| S6 | aspheric | −2.0704 | 0.0250 | | | | −0.2658 |
| S7 | aspheric | 5.4422 | 0.2000 | 1.67 | 20.40 | −7.26 | 14.1499 |
| S8 | aspheric | 2.5216 | 0.7912 | | | | −0.5567 |
| S9 | aspheric | −2.2077 | 0.2005 | 1.55 | 56.11 | −25.20 | 0.2520 |
| S10 | aspheric | −2.7140 | 0.2076 | | | | −0.2825 |
| S11 | aspheric | −1.2554 | 0.4132 | 1.55 | 56.11 | 31.19 | −1.0883 |
| S12 | aspheric | −1.3051 | 0.0250 | | | | −0.9852 |
| S13 | aspheric | 3.0478 | 0.6952 | 1.64 | 25.92 | 13.02 | −0.6559 |
| S14 | aspheric | 4.3830 | 0.6738 | | | | −58.5492 |
| S15 | aspheric | −8.7882 | 0.3000 | 1.55 | 23.84 | −5.92 | 0.8898 |
| S16 | aspheric | 5.1784 | 0.5817 | | | | −2.1143 |
| S17 | spherical | infinite | 0.1100 | 1.52 | 64.17 | | |
| S18 | spherical | infinite | 0.1829 | | | | |
| S19 | spherical | infinite | | | | | |

TABLE 12

| Surface number | A4 | A6 | A8 | A10 | A12 |
|---|---|---|---|---|---|
| S1 | −4.7209E−02 | 1.4621E−01 | −1.2269E+00 | 5.1442E+00 | −1.3082E+01 |
| S2 | −4.1682E−03 | −1.8248E−01 | 1.1961E+00 | −4.8578E+00 | 1.2593E+01 |
| S3 | −9.7839E−02 | −7.5087E−02 | 2.1216E−01 | 4.5276E−01 | 1.2214E−01 |

TABLE 12-continued

| | | | | | |
|---|---|---|---|---|---|
| S4 | −8.8119E−02 | −1.0126E−01 | 4.7611E−01 | −1.7509E+00 | 4.0662E+00 |
| S5 | −1.4830E−02 | −2.4734E−02 | 1.2255E−01 | −5.2452E−01 | 1.4046E+00 |
| S6 | −1.3512E−02 | 6.6727E−02 | −3.7535E−01 | 1.0005E+00 | −1.8562E+00 |
| S7 | −1.7284E−01 | 3.6949E−01 | −8.9546E−01 | 1.5032E+00 | −1.7694E+00 |
| S8 | −1.8758E−01 | 2.9999E−01 | −5.0706E−01 | 6.3837E−01 | −5.8277E−01 |
| S9 | −2.1552E−01 | 4.0499E−01 | −8.2555E−01 | 1.3763E+00 | −1.4114E+00 |
| S10 | −2.1527E−01 | 4.0177E−01 | −5.9493E−01 | 6.1635E−01 | −3.6977E−01 |
| S11 | 2.0890E−01 | −8.2892E−02 | −5.3598E−02 | 1.0554E−01 | −7.2297E−02 |
| S12 | 1.2689E−01 | −1.3047E−01 | 1.4727E−01 | −9.6023E−02 | 3.7098E−02 |
| S13 | −1.0446E−01 | −7.2432E−04 | 3.3702E−02 | −2.1661E−02 | 7.2972E−03 |
| S14 | 3.1913E−03 | −3.6408E−02 | 2.6909E−02 | −9.8323E−03 | 2.1307E−03 |
| S15 | 1.7995E−03 | 4.3972E−05 | 1.4504E−04 | −1.1032E−04 | 2.7216E−05 |
| S16 | −2.7215E−02 | 8.6419E−03 | −2.0982E−03 | 3.1218E−04 | −3.1518E−05 |

| Surface number | A14 | A16 | A18 | A20 |
|---|---|---|---|---|
| S1 | 2.0547E+01 | −1.9469E+01 | 1.0198E+01 | −2.2670E+00 |
| S2 | −2.0407E+01 | 1.9847E+01 | −1.0404E+01 | 2.1870E+00 |
| S3 | 1.8296E+00 | 4.4648E+00 | 4.3940E+00 | −1.6469E+00 |
| S4 | −5.9693E+00 | 5.3220E+00 | −2.6351E+00 | 5.5180E−01 |
| S5 | −2.2676E+00 | 2.1374E+00 | −1.0727E+00 | 2.2025E−01 |
| S6 | 2.3306E+00 | −1.8345E+00 | 8.0861E−01 | −1.5050E−01 |
| S7 | 1.4253E+00 | −7.3529E−01 | 2.1746E−01 | −2.8134E−02 |
| S8 | 3.7406E−01 | −1.5713E−01 | 3.8820E−02 | 4.3013E−03 |
| S9 | 9.0533E−01 | −3.6430E−01 | 8.4993E−02 | −8.7948E−03 |
| S10 | 1.2577E−01 | −2.3146E−02 | 1.9280E−03 | −3.4005E−05 |
| S11 | 2.7896E−02 | −6.4120E−03 | 7.8941E−04 | −3.6689E−05 |
| S12 | −8.2757E−03 | 8.8732E−04 | −1.0455E−05 | −3.8719E−06 |
| S13 | −1.5292E−03 | 2.0283E−04 | −1.5744E−05 | 5.4485E−07 |
| S14 | −2.8900E−04 | 2.4275E−05 | −1.1623E−06 | 2.4354E−08 |
| S15 | −3.2566E−06 | 2.0808E−07 | −6.8544E−09 | 9.1829E−11 |
| S16 | 2.2641E−06 | −1.0978E−07 | 3.1293E−09 | −3.8778E−11 |

Figure 12A:
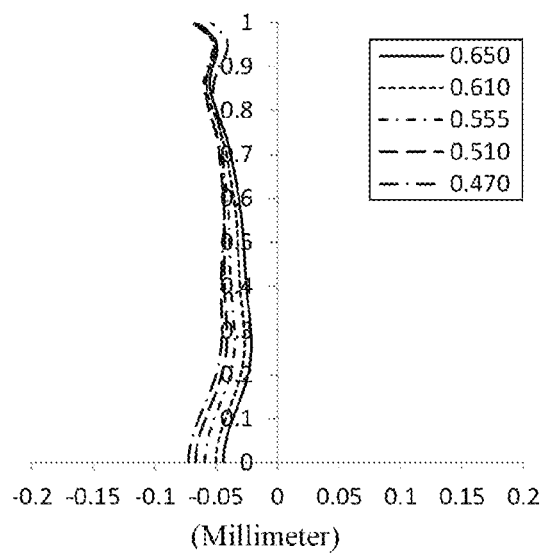
FIG. 12A illustrates a longitudinal aberration curve of the optical imaging system of the Example 6.
Figure 12B:
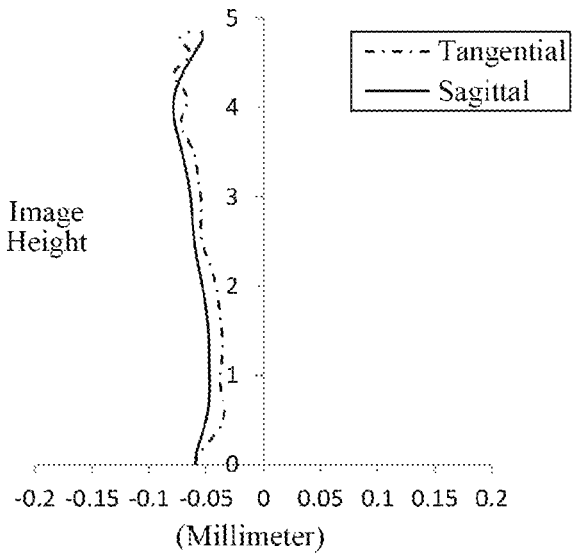
FIG. 12B illustrates an astigmatic curve of the optical imaging system of the Example 6.
Figure 12C:
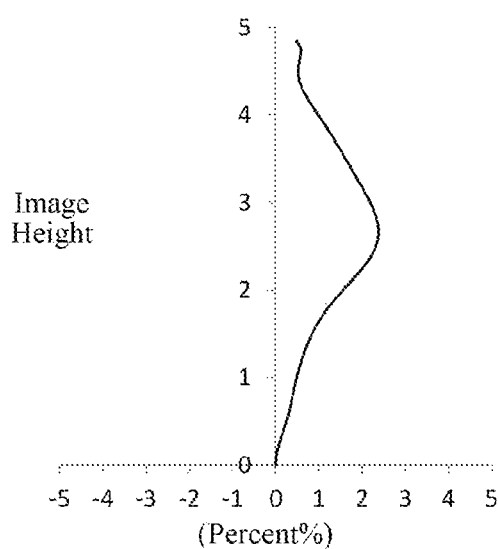
FIG. 12C illustrates a distortion curve of the optical imaging system of the Example 6.
Figure 12D:
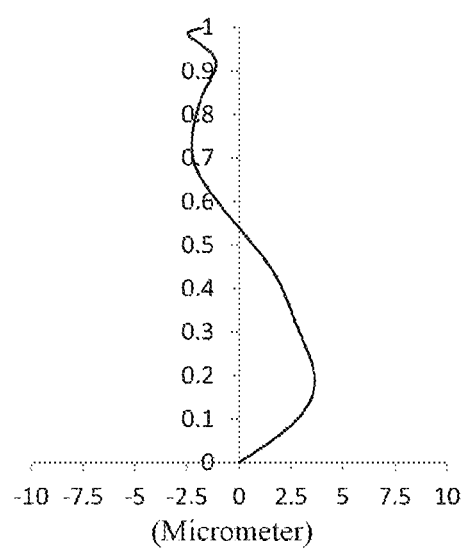
FIG. 12D illustrates a lateral color curve of the optical imaging system of the Example 6.

FIG. 12A illustrates a longitudinal aberration curve of the optical imaging system according to example 6, representing deviations of focal points converged by light of different wavelengths after passing through the optical imaging system. FIG. 12B illustrates an astigmatic curve of the optical imaging system according to example 6, representing a curvature of a tangential plane and a curvature of a sagittal plane. FIG. 12C illustrates a distortion curve of the optical imaging system according to example 6, representing amounts of distortion at different image heights. FIG. 12D illustrates a lateral color curve of the optical imaging system according to example 6, representing deviations of different image heights on an imaging plane after light passes through the optical imaging system. It can be seen from FIG. 12A to FIG. 12D that the optical imaging system provided in example 6 may achieve good image quality.

Example 7

Figure 13:
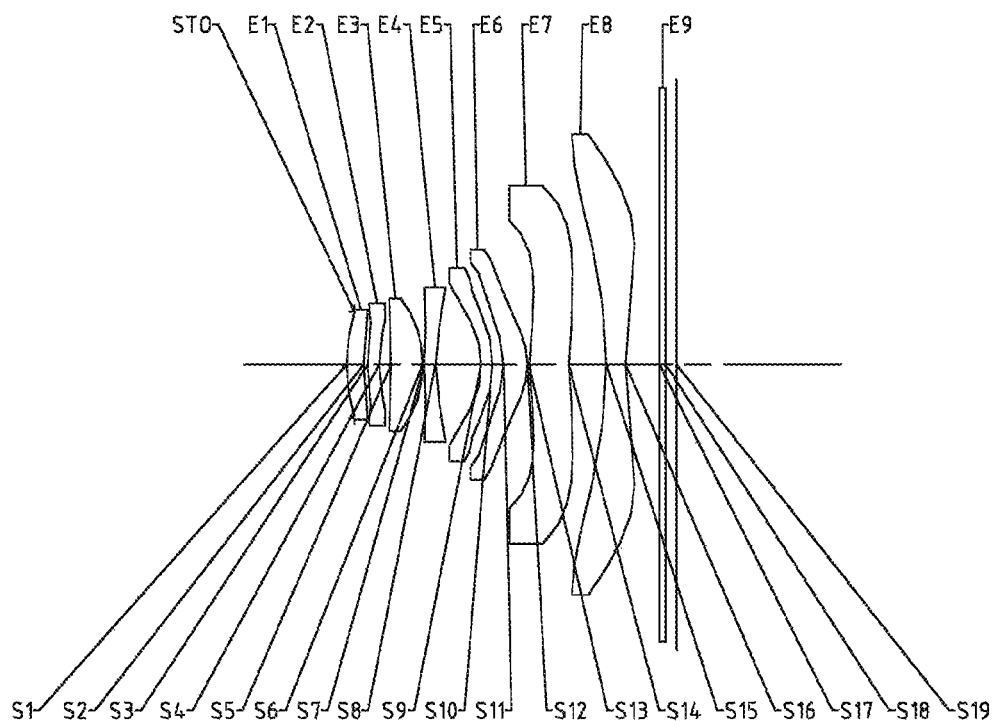
FIG. 13 illustrates a schematic structural view of an optical imaging system according to Example 7 of the present disclosure.

An optical imaging system according to example 7 of the present disclosure is described below with reference to FIG. 13 to FIG. 14D. FIG. 13 shows a schematic structural view of the optical imaging system according to example 7 of the present disclosure.

As shown in FIG. 13, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a concave surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a concave surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 7, a total effective focal length f of the optical imaging system satisfies f=4.12 mm, an axial distance TTL from the object-side surface of the first lens to the imaging plane satisfies TTL=5.73 mm, half of a diagonal length ImgH of an effective pixel area on the imaging plane satisfies ImgH=4.95 mm; and half of a maximal field-of-view Semi-FOV satisfies Semi-FOV=49.5°.

Table 13 shows a table of basic parameters of the optical imaging system in example 7, wherein the units for the radius of curvature, the thickness and the focal length are millimeter (mm). Table 14 shows high-order coefficients applicable to each aspheric surface in example 7, wherein the surface shape of each aspheric surface may be defined by the formula (1) given in the above example 1.

TABLE 13

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.1355 | | | | |
| S1 | aspheric | 2.8274 | 0.2980 | 1.55 | 56.11 | 12.84 | 4.0047 |
| S2 | aspheric | 4.5626 | 0.0697 | | | | −20.5525 |
| S3 | aspheric | 2.7967 | 0.2000 | 1.67 | 20.40 | −23.82 | −2.8294 |
| S4 | aspheric | 2.3094 | 0.2049 | | | | 0.9541 |
| S5 | aspheric | −250.6660 | 0.5514 | 1.76 | 45.60 | 2.74 | −86.9325 |
| S6 | aspheric | −2.0617 | 0.0250 | | | | −0.2384 |
| S7 | aspheric | 5.5292 | 0.2000 | 1.67 | 20.40 | −7.49 | 13.7343 |
| S8 | aspheric | 2.5834 | 0.7845 | | | | −0.5656 |
| S9 | aspheric | −2.0197 | 0.1955 | 1.55 | 56.11 | −15.44 | 0.0638 |
| S10 | aspheric | −2.7471 | 0.2013 | | | | −0.1924 |
| S11 | aspheric | −1.3338 | 0.4092 | 1.55 | 56.11 | 18.33 | −1.0816 |
| S12 | aspheric | −1.3044 | 0.0323 | | | | −1.0132 |
| S13 | aspheric | 3.0152 | 0.6888 | 1.64 | 25.92 | 12.93 | −0.6697 |
| S14 | aspheric | 4.3266 | 0.6505 | | | | −58.5492 |
| S15 | aspheric | −8.1184 | 0.3368 | 1.55 | 23.84 | −5.66 | 0.4476 |
| S16 | aspheric | 5.0559 | 0.5862 | | | | −3.8593 |
| S17 | spherical | infinite | 0.1100 | 1.52 | 64.17 | | |
| S18 | spherical | infinite | 0.1873 | | | | |
| S19 | spherical | infinite | | | | | |

TABLE 14

| Surface number | A4 | A6 | A8 | A10 | A12 |
|---|---|---|---|---|---|
| S1 | −5.0569E−02 | 1.8632E−01 | −1.4035E+00 | 5.4829E+00 | −1.3091E+01 |
| S2 | −4.6058E−03 | −2.4121E−01 | 1.8087E+00 | −7.7201E+00 | 2.0031E+01 |
| S3 | −1.0790E−01 | −3.6055E−02 | 1.7840E−01 | −7.3520E−01 | 1.2768E+00 |
| S4 | −9.0398E−02 | −8.2742E−02 | 4.6588E−01 | −1.8769E+00 | 4.4365E+00 |
| S5 | −1.6533E−02 | −2.5964E−03 | 4.4360E−03 | −1.1049E−01 | 5.1223E−01 |
| S6 | −1.0869E−02 | 7.9134E−02 | −4.8850E−01 | 1.3781E+00 | −2.5315E+00 |
| S7 | −1.6891E−01 | 3.7398E−01 | −9.7708E−01 | 1.7500E+00 | −2.1395E+00 |
| S8 | −1.8582E−01 | 3.0107E−01 | −5.2937E−01 | 6.8984E−01 | −6.3123E−01 |
| S9 | −2.4744E−01 | 6.1922E−01 | −1.4324E+00 | 2.3545E+00 | −2.3856E+00 |
| S10 | −2.4643E−01 | 5.9548E−01 | −1.0628E+00 | 1.2109E+00 | −8.1594E−01 |
| S11 | 1.9781E−01 | −2.6020E−02 | −1.9492E−01 | 2.8161E−01 | −1.9588E−01 |
| S12 | 1.2439E−01 | −1.2360E−01 | 1.3183E−01 | −7.8370E−02 | 2.6859E−02 |
| S13 | −1.0448E−01 | 4.9405E−03 | 2.4645E−02 | −1.5016E−02 | 4.4773E−03 |
| S14 | 3.5888E−03 | −3.6015E−02 | 2.6152E−02 | −9.4005E−03 | 1.9989E−03 |
| S15 | −8.5211E−04 | 1.3697E−03 | −1.3504E−04 | −7.7699E−05 | 2.4642E−05 |
| S16 | −3.3299E−02 | 1.2952E−02 | −3.6713E−03 | 6.6487E−04 | −8.0373E−05 |

| Surface number | A14 | A16 | A18 | A20 |
|---|---|---|---|---|
| S1 | 1.9334E+01 | −1.7216E+01 | 8.4594E+00 | −1.7595E+00 |
| S2 | −3.1966E+01 | 3.0511E+01 | −1.5813E+01 | 3.3622E+00 |
| S3 | −3.5771E−01 | −2.0526E+00 | 2.8773E+00 | −1.2184E+00 |
| S4 | −6.4213E+00 | 5.5816E+00 | −2.6822E+00 | 5.4393E−01 |
| S5 | −1.0992E+00 | 1.2254E+00 | −6.7911E−01 | 1.4748E−01 |
| S6 | 3.0255E+00 | −2.2427E+00 | 9.3282E−01 | −1.6495E−01 |
| S7 | 1.7370E+00 | −8.8346E−01 | 2.5388E−01 | −3.1550E−02 |
| S8 | 3.9058E−01 | −1.5296E−01 | 3.4244E−02 | −3.3624E−03 |
| S9 | 1.5291E+00 | −6.1798E−01 | 1.4505E−01 | −1.5097E−02 |
| S10 | 3.3102E−01 | −8.0281E−02 | 1.0809E−02 | −6.2852E−04 |
| S11 | 7.9311E−02 | −1.9020E−02 | 2.4823E−03 | −1.3356E−04 |
| S12 | −5.1617E−03 | 4.2539E−04 | 1.1307E−05 | −2.9420E−06 |
| S13 | −7.9839E−04 | 8.8566E−05 | −5.8512E−06 | 1.8169E−07 |
| S14 | −2.6499E−04 | 2.1658E−05 | −1.0047E−06 | 2.0332E−08 |
| S15 | −3.0733E−06 | 1.9602E−07 | −6.3440E−09 | 8.2816E−11 |
| S16 | 6.4241E−06 | −3.2146E−07 | 9.0290E−09 | −1.0799E−10 |

Figure 14A:
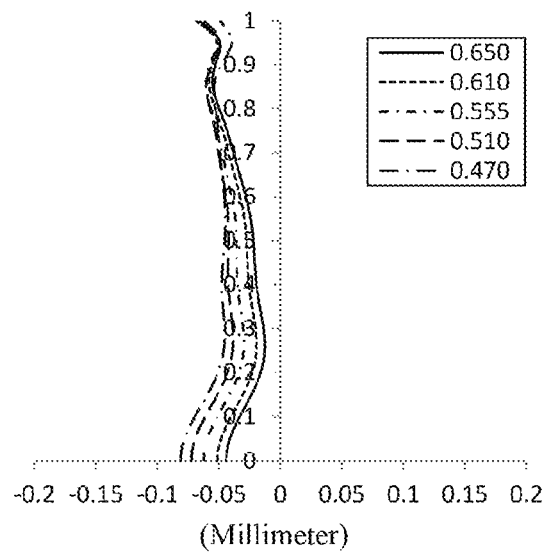
FIG. 14A illustrates a longitudinal aberration curve of the optical imaging system of the Example 7.
Figure 14B:
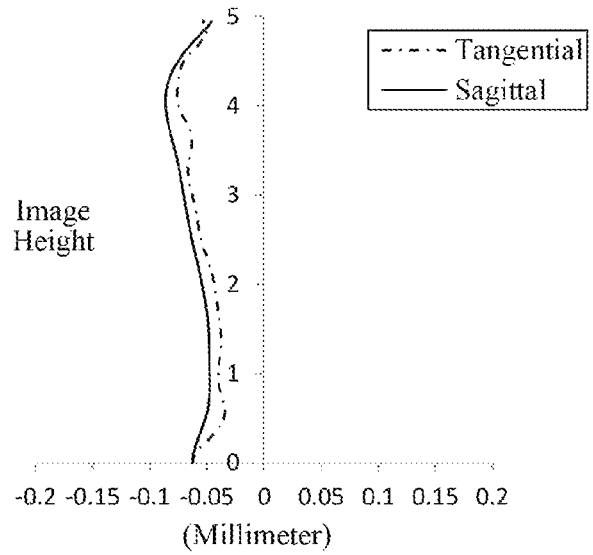
FIG. 14B illustrates an astigmatic curve of the optical imaging system of the Example 7.

FIG. 14A illustrates a longitudinal aberration curve of the optical imaging system according to example 7, representing deviations of focal points converged by light of different wavelengths after passing through the optical imaging system. FIG. 14B illustrates an astigmatic curve of the optical imaging system according to example 7, representing a curvature of a tangential plane and a curvature of a sagittal plane. FIG. 14C illustrates a distortion curve of the optical imaging system according to example 7, representing amounts of distortion at different image heights. FIG. 14D illustrates a lateral color curve of the optical imaging system according to example 7, representing deviations of different image heights on an imaging plane after light passes through the optical imaging system. It can be seen from FIG. 14A to FIG. 14D that the optical imaging system provided in example 7 may achieve good image quality.

Example 8

An optical imaging system according to example 8 of the present disclosure is described below with reference to FIG. 15 to FIG. 16D. FIG. 15 shows a schematic structural view of the optical imaging system according to example 8 of the present disclosure.

As shown in FIG. 15, the optical imaging system includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, sequentially from an object side to an image side along an optical axis.

The first lens E1 has a positive refractive power. An object-side surface S1 of the first lens E1 is a convex surface, and an image-side surface S2 of the first lens E1 is a concave surface. The second lens E2 has a negative refractive power. An object-side surface S3 of the second lens E2 is a convex surface, and an image-side surface S4 of the second lens E2 is a concave surface. The third lens E3 has a positive refractive power. An object-side surface S5 of the third lens E3 is a convex surface, and an image-side surface S6 of the third lens E3 is a convex surface. The fourth lens E4 has a negative refractive power. An object-side surface S7 of the fourth lens E4 is a convex surface, and an image-side surface S8 of the fourth lens E4 is a concave surface. The fifth lens E5 has a negative refractive power. An object-side surface S9 of the fifth lens E5 is a concave surface, and an image-side surface S10 of the fifth lens E5 is a convex surface. The sixth lens E6 has a positive refractive power. An object-side surface S11 of the sixth lens E6 is a concave surface, and an image-side surface S12 of the sixth lens E6 is a convex surface. The seventh lens E7 has a positive refractive power. An object-side surface S13 of the seventh lens E7 is a convex surface, and an image-side surface S14 of the seventh lens E7 is a convex surface. The eighth lens E8 has a negative refractive power. An object-side surface S15 of the eighth lens E8 is a concave surface, and an image-side surface S16 of the eighth lens E8 is a concave surface. The optical filter E9 has an object-side surface S17 and an image-side surface S18. Light from an object sequentially passes through the respective surfaces S1 to S18 and is finally imaged on the imaging plane S19.

In example 8, a total effective focal length f of the optical imaging system satisfies f=4.45 mm, an axial distance TTL from the object-side surface of the first lens to the imaging plane satisfies TTL=5.95 mm, half of a diagonal length ImgH of an effective pixel area on the imaging plane satisfies ImgH=5.20 mm; and half of a maximal field-of-view Semi-FOV satisfies Semi-FOV=48.9°.

Table 15 shows a table of basic parameters of the optical imaging system in example 8, wherein the units for the radius of curvature, the thickness and the focal length are millimeter (mm). Table 16 shows high-order coefficients applicable to each aspheric surface in example 8, wherein the surface shape of each aspheric surface may be defined by the formula (1) given in the above example 1.

TABLE 15

| Surface number | Surface type | Radius of curvature | Thickness | Material Refractive index | Abbe number | Focal length | Conic coefficient |
|---|---|---|---|---|---|---|---|
| OBJ | spherical | infinite | infinite | | | | |
| STO | spherical | infinite | −0.1327 | | | | |
| S1 | aspheric | 2.9325 | 0.2878 | 1.55 | 56.11 | 14.52 | 3.8817 |
| S2 | aspheric | 4.4932 | 0.0655 | | | | −12.2676 |
| S3 | aspheric | 2.8403 | 0.2100 | 1.67 | 20.40 | −22.10 | −2.3894 |
| S4 | aspheric | 2.3107 | 0.2077 | | | | 0.7873 |
| S5 | aspheric | 53.2470 | 0.5751 | 1.75 | 45.50 | 2.75 | 19.8455 |
| S6 | aspheric | −2.1563 | 0.0314 | | | | −0.1040 |
| S7 | aspheric | 5.8382 | 0.2184 | 1.67 | 20.40 | −7.60 | 13.5007 |
| S8 | aspheric | 2.6711 | 0.8606 | | | | −0.5224 |
| S9 | aspheric | −2.1412 | 0.2220 | 1.55 | 56.11 | −19.78 | 0.0781 |
| S10 | aspheric | −2.7685 | 0.2233 | | | | −0.1934 |
| S11 | aspheric | −1.5243 | 0.3477 | 1.55 | 56.11 | 19.81 | −1.0170 |
| S12 | aspheric | −1.4436 | 0.0250 | | | | −1.0295 |
| S13 | aspheric | 8.4855 | 0.8881 | 1.64 | 25.92 | 11.77 | 5.2305 |
| S14 | aspheric | −64.8329 | 0.6166 | | | | −58.5492 |
| S15 | aspheric | −8.0409 | 0.3000 | 1.55 | 23.84 | −4.44 | 0.2827 |
| S16 | aspheric | 3.5212 | 0.6118 | | | | −10.1054 |
| S17 | spherical | infinite | 0.1100 | 1.52 | 64.17 | | |
| S18 | spherical | infinite | 0.1512 | | | | |
| S19 | spherical | infinite | | | | | |

TABLE 16

| Surface number | A4 | A6 | A8 | A10 | A12 |
|---|---|---|---|---|---|
| S1 | −4.0207E−02 | 8.1306E−02 | −6.5656E−01 | 2.4874E+00 | −5.7308E+00 |
| S2 | −1.2760E−02 | −1.1212E−01 | 8.9448E−01 | −3.6884E+00 | 9.3545E+00 |
| S3 | −9.4669E−02 | −4.1940E−02 | 2.6664E−01 | −1.0038E+00 | 2.1811E+00 |

TABLE 16-continued

| | | | | |
|---|---|---|---|---|
| S4 | −8.4341E−02 | −4.9298E−02 | 2.2112E−01 | −7.6858E−01 | 1.6466E+00 |
| S5 | −1.3895E−02 | −6.1617E−03 | 1.9020E−03 | −4.1542E−02 | 2.0358E−01 |
| S6 | −1.5148E−02 | 7.2952E−02 | −2.7908E−01 | 4.5299E−01 | −4.3540E−01 |
| S7 | −1.4767E−01 | 2.9477E−01 | −6.4556E−01 | 9.2964E−01 | −8.9513E−01 |
| S8 | −1.5770E−01 | 2.1884E−01 | −3.0871E−01 | 3.0092E−01 | −1.8847E−01 |
| S9 | −1.9667E−01 | 3.1899E−01 | −5.1514E−01 | 7.5622E−01 | −7.0996E−01 |
| S10 | −1.8021E−01 | 2.7909E−01 | −3.3435E−01 | 2.7909E−01 | −1.2310E−01 |
| S11 | 1.8694E−01 | −8.2233E−02 | −9.7872E−03 | 3.4875E−02 | −1.7999E−02 |
| S12 | 9.6834E−02 | −1.1606E−01 | 1.6179E−01 | −1.2234E−01 | 5.5106E−02 |
| S13 | −8.7433E−02 | −3.4018E−02 | 7.8462E−02 | −5.2117E−02 | 1.9203E−02 |
| S14 | −2.3463E−03 | −2.7372E−02 | 2.1829E−02 | −8.4853E−03 | 1.9466E−03 |
| S15 | 4.6199E−03 | −1.9320E−04 | −3.3129E−04 | 8.3054E−05 | −8.3995E−06 |
| S16 | −2.9440E−02 | 1.2585E−02 | −3.6343E−03 | 6.4352E−04 | −7.2739E−05 |

| Surface number | A14 | A16 | A18 | A20 |
|---|---|---|---|---|
| S1 | 8.1432E+00 | −6.9564E+00 | 3.2645E+00 | −6.4423E−01 |
| S2 | −1.4710E+01 | 1.3945E+01 | −7.2474E+00 | 1.5716E+00 |
| S3 | −2.8150E+00 | 1.9565E+00 | −5.4892E−01 | −2.0229E−02 |
| S4 | −2.2467E+00 | 1.8746E+00 | −8.7293E−01 | 1.7234E−01 |
| S5 | −4.3079E−01 | 4.6833E−01 | −2.5428E−01 | 5.4899E−02 |
| S6 | 2.5544E−01 | −8.8224E−02 | 1.5794E−02 | −5.0033E−04 |
| S7 | 5.7216E−01 | −2.3062E−01 | 5.2650E−02 | −5.1667E−03 |
| S8 | 6.8170E−02 | −8.8645E−03 | −2.0036E−03 | 6.1397E−04 |
| S9 | 4.2444E−01 | −1.6171E−01 | 3.6102E−02 | −3.5873E−03 |
| S10 | 2.2010E−02 | 1.7212E−03 | −1.1900E−03 | 1.2144E−04 |
| S11 | 3.6591E−03 | 5.2771E−05 | −1.4522E−04 | 1.7368E−05 |
| S12 | −1.5343E−02 | 2.5823E−03 | −2.4121E−04 | 9.6590E−06 |
| S13 | −4.4003E−03 | 6.3383E−04 | −5.3544E−05 | 2.0510E−06 |
| S14 | −2.7841E−04 | 2.4568E−05 | −1.2329E−06 | 2.7081E−08 |
| S15 | 4.0776E−07 | −7.9402E−09 | −3.4202E−11 | 2.3505E−12 |
| S16 | 5.2572E−06 | −2.3412E−07 | 5.8336E−09 | −6.2106E−11 |

Figure 16A:
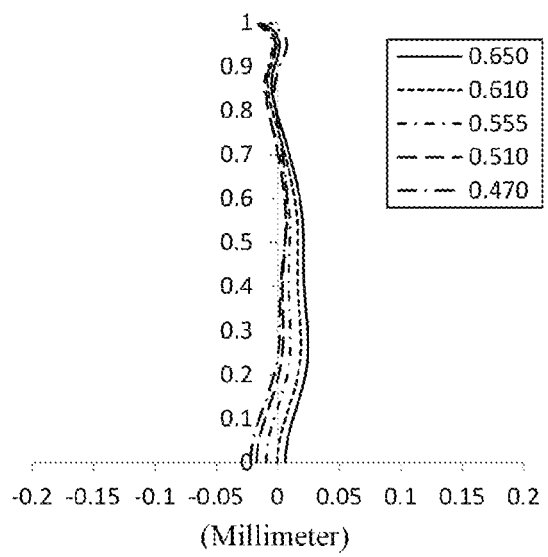
FIG. 16A illustrates a longitudinal aberration curve of the optical imaging system of the Example 8.
Figure 16B:
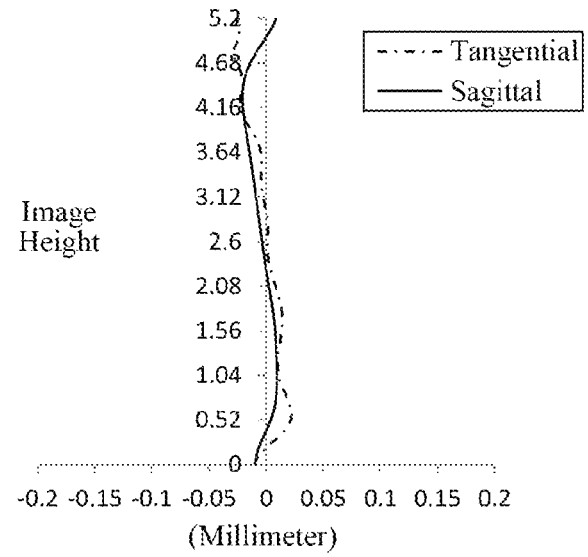
FIG. 16B illustrates an astigmatic curve of the optical imaging system of the Example 8.
Figure 16C:
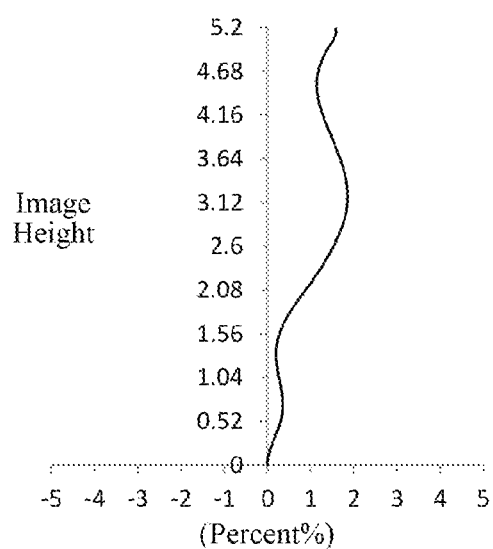
FIG. 16C illustrates a distortion curve of the optical imaging system of the Example 8.
Figure 16D:
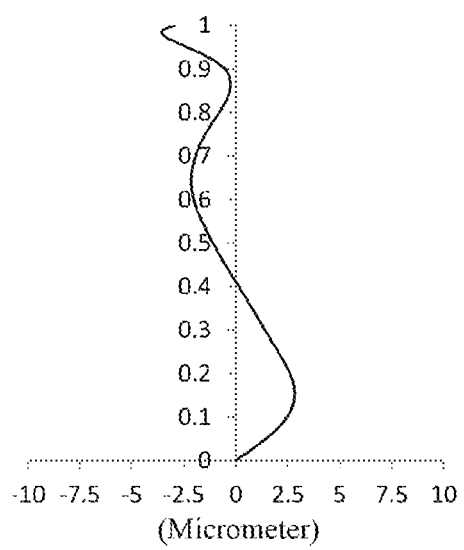
FIG. 16D illustrates a lateral color curve of the optical imaging system of the Example 8.

FIG. 16A illustrates a longitudinal aberration curve of the optical imaging system according to example 8, representing deviations of focal points converged by light of different wavelengths after passing through the optical imaging system. FIG. 16B illustrates an astigmatic curve of the optical imaging system according to example 8, representing a curvature of a tangential plane and a curvature of a sagittal plane. FIG. 16C illustrates a distortion curve of the optical imaging system according to example 8, representing amounts of distortion at different image heights. FIG. 16D illustrates a lateral color curve of the optical imaging system according to example 8, representing deviations of different image heights on an imaging plane after light passes through the optical imaging system. It can be seen from FIG. 16A to FIG. 16D that the optical imaging system provided in example 8 may achieve good image quality.

In view of the above, examples 1 to 8 respectively satisfy the relationship shown in Table 17.

TABLE 17

| | Example | | | | | | | |
|---|---|---|---|---|---|---|---|---|
| Condition | 1 | 2 | 3 | 4 | 5 | 6 | 7 | 8 |
| TTL/ImgH | 1.13 | 1.14 | 1.16 | 1.15 | 1.11 | 1.18 | 1.16 | 1.14 |
| \|f2\|/f1 | 2.10 | 1.48 | 1.61 | 2.29 | 1.43 | 1.38 | 1.86 | 1.52 |
| f4/f8 | 1.10 | 1.12 | 0.97 | 1.20 | 1.20 | 1.23 | 1.32 | 1.71 |
| R3/R4 | 0.96 | 1.25 | 1.21 | 1.13 | 1.27 | 1.28 | 1.21 | 1.23 |
| f/EPD | 2.36 | 2.35 | 2.35 | 1.98 | 2.35 | 2.25 | 2.23 | 2.37 |
| R7/R8 | 2.27 | 2.11 | 2.05 | 2.16 | 2.14 | 2.16 | 2.14 | 2.19 |
| R10/R9 | 1.36 | 1.36 | 1.33 | 0.98 | 1.36 | 1.23 | 1.36 | 1.29 |
| R2/R1 | 1.19 | 1.61 | 1.53 | 1.40 | 1.64 | 1.65 | 1.61 | 1.53 |
| R11/R12 | 1.02 | 1.11 | 1.37 | 0.89 | 1.01 | 0.96 | 1.02 | 1.06 |
| R15/R16 | −1.32 | −1.37 | −1.13 | −1.70 | −1.65 | −1.70 | −1.61 | −2.28 |
| CT1/T12 | 3.17 | 3.38 | 3.42 | 4.42 | 3.59 | 4.20 | 4.27 | 4.39 |
| CT3/CT5 | 2.66 | 2.82 | 2.93 | 2.69 | 2.76 | 2.79 | 2.82 | 2.59 |
| T45/CT4 | 3.83 | 4.04 | 4.18 | 3.61 | 3.97 | 3.96 | 3.92 | 3.94 |

TABLE 17-continued

| | Example | | | | | | | |
|---|---|---|---|---|---|---|---|---|
| Condition | 1 | 2 | 3 | 4 | 5 | 6 | 7 | 8 |
| f/f3 | 1.50 | 1.62 | 1.63 | 1.41 | 1.58 | 1.56 | 1.51 | 1.62 |
| N3 | 1.76 | 1.76 | 1.76 | 1.76 | 1.76 | 1.76 | 1.76 | 1.75 |
| V3 | 45.60 | 45.60 | 45.60 | 45.60 | 45.60 | 45.60 | 45.60 | 45.50 |

The present disclosure further provides an imaging apparatus, having a photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging system described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:
1. An optical imaging system, comprising: a first lens, a second lens, a third lens, a fourth lens, a fifth lens, a sixth lens, a seventh lens and an eighth lens, which have refractive power and are sequentially arranged from an object side of the optical imaging system to an image side of the optical imaging system along an optical axis of the optical imaging system,
wherein,
an object-side surface of the second lens is convex in a paraxial region thereof, and an image-side surface of the second lens is concave in a paraxial region thereof;
an object-side surface of the fourth lens is convex in a paraxial region thereof, and an image-side surface of the fourth lens is concave in a paraxial region thereof;
an object-side surface of the fifth lens is concave in a paraxial region thereof, and an image-side surface of the fifth lens is convex in a paraxial region thereof;
each of the third lens and the sixth lens has positive refractive power;
wherein 0.5<R11/R12<1.5, where R11 is a radius of curvature of an object-side surface of the sixth lens and R12 is a radius of curvature of an image-side surface of the sixth lens; and $$0.5<f4/f8<2.0,$$

where f4 is an effecthe focal length of the fourth lens, and f8 is an effective focal length of the eighth lens.

2. The optical imaging system according to claim 1, wherein 1.0<|f2|/f1<2.5,
where f2 is an effective focal length of the second lens, and f1 is an effective focal length of the first lens.

3. The optical imaging system according to claim 1, wherein 0.5<R3/R4<1.5,
where R3 is a radius of curvature of the object-side surface of the second lens, and R4 is a radius of curvature of the image-side surface of the second lens.

4. The optical imaging system according to claim 1, wherein 2.0<R7/R8 21 2.5,
where R7 is a radius of curvature of the object-side surface of the fourth lens, and R8 is a radius of curvature of the image-side surface of the fourth lens.

5. The optical imaging system according to claim 1, wherein 0.5<R10/R9<1.5,
where R9 is a radius of curvature of the object-side surface of the fifth lens and R10 is a radius of curvature of the image-side surface of the fifth lens.

6. The optical imaging system according to claim 1, wherein 1.0<R2/R1<2.0,
where R2 is a radius of curvature of an image-side surface of the first lens and R1 is a radius of curvature of an object-side surface of the first lens.

7. The optical imaging system according to claim 1, wherein −2.5<R15/R16<−1,
where R15 is a radius of curvature of an object-side surface of the eighth lens, and R16 is a radius of curvature of an image-side surface of the eighth lens.

8. The optical imaging system according to claim 1, wherein 1.0<f/f3<2.0,
where f is a total effective focal length of the optical imaging system, and f3 is an effective focal length of the third lens.

9. The optical imaging system according to claim 1, wherein f/EPD<2.5,
where f is a total effective focal length of the optical imaging system, and EPD is an entrance pupil diameter of the optical imaging system.

10. An optical imaging system, comprising: a first lens, a second lens, a third lens, a fourth lens, a fifth lens, a sixth lens, a seventh lens and an eighth lens, which have refractive power and are sequentially arranged from an object side of the optical imaging system to an image side of the optical imaging system along an optical axis of the optical imaging system,
wherein,
an object-side surface of the second lens is convex in a paraxial region thereof, and an image-side surface of the second lens is concave in a paraxial region thereof;
an object-side surface of the fourth lens is convex in a paraxial region thereof, and an image-side surface of the fourth lens is concave in a paraxial region thereof;
an object-side surface of the fifth lens is concave in a paraxial region thereof, and an image-side surface of the fifth lens is convex in a paraxial region thereof;
each of the third lens and the sixth lens has positive refractive power;
wherein 1.0<TTL/ImgH<1.5, where TTL is a distance along the optical axis from an object-side surface of the first lens to an imaging plane of the optical imaging system, and ImgH is half of a diagonal length of an effective pixel area on the imaging plane of the optical imaging system; and $$0.5<f4/f8<2.0,$$

where f4 is an effecthe focal length of the fourth lens, and f8 is an effective focal length of the eighth lens.

11. The optical imaging system according to claim 10, wherein 1.0<|f2|/f1<2.5,
where f2 is an effective focal length of the second lens, and f1 is an effective focal length of the first lens.

12. The optical imaging system according to claim 10, wherein the eighth lens has a negative refractive power.

13. The optical imaging system according to claim 10, wherein 3<CT1/T12<4.5,
where CT1 is a center thickness of the first lens along the optical axis, and T12 is a spaced interval between the first lens and the second lens along the optical axis.

14. The optical imaging system according to claim 10, wherein 2.5<CT3/CT5<3.0,
where CT3 is a center thickness of the third lens along the optical axis, and CT5 is a center thickness of the fifth lens along the optical axis.

15. The optical imaging system according to claim 10, wherein 1.0<f/f3<2.0,
where f is a total effective focal length of the optical imaging system, and f3 is an effective focal length of the third lens.

16. The optical imaging system according to claim 10, wherein N3>1.7, and V3>45.6,
where N3 is a refractive index of the third lens, and V3 is an Abbe number of the third lens.

17. The optical imaging system according to claim 10, wherein Semi-FOV ≥48°,
where Semi-FOV is half of a maximal field-of-view of the optical imaging system.

18. The optical imaging system according to claim 10, wherein ImgH>4.8 mm,
where ImgH is half of the diagonal length of the effective pixel area on the imaging plane of the optical imaging system.

* * * * *